US012625521B2

(12) United States Patent
Nozawa et al.

(10) Patent No.: US 12,625,521 B2
(45) Date of Patent: May 12, 2026

(54) VIRTUAL INPUT DEVICE, VIRTUAL INPUT SYSTEM, VIRTUAL INPUT METHOD, AND RECORDING MEDIUM

(71) Applicant: NEC Platforms, Ltd., Kawasaki (JP)

(72) Inventors: Yoshiaki Nozawa, Kanagawa (JP); Daisuke Shimada, Kanagawa (JP); Takuya Yagyu, Kanagawa (JP); Shinichi Yamanaka, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 167 days.

(21) Appl. No.: 18/410,469

(22) Filed: Jan. 11, 2024

(65) Prior Publication Data

US 2024/0264638 A1    Aug. 8, 2024

(30) Foreign Application Priority Data

Feb. 8, 2023    (JP) ................................. 2023-017951

(51) Int. Cl.
*G06F 1/16*      (2006.01)
*G02B 27/01*     (2006.01)
*G06F 3/01*      (2006.01)
*G06F 21/32*     (2013.01)
*G06F 21/44*     (2013.01)

(52) U.S. Cl.
CPC ....... *G06F 1/1673* (2013.01); *G02B 27/0101* (2013.01); *G02B 27/017* (2013.01); *G06F 3/011* (2013.01); *G06F 21/32* (2013.01); *G06F 21/44* (2013.01); *G02B 2027/0138* (2013.01); *G02B 2027/014* (2013.01)

(58) Field of Classification Search
CPC ........ G06F 1/1673; G06F 3/011; G06F 21/32; G06F 21/44; G02B 27/0101; G02B 27/017; G02B 2027/0138; G02B 2027/014
See application file for complete search history.

(56) References Cited

U.S. PATENT DOCUMENTS 5,689,669 A * 11/1997 Lynch ................... G06F 3/0481
                                                               715/848
6,002,853 A * 12/1999 de Hond ............... G06F 16/954
                                                               709/219

(Continued)

FOREIGN PATENT DOCUMENTS

JP          H11-272386 A     10/1999
JP          2004-164517 A     6/2004

(Continued)

OTHER PUBLICATIONS

JP Office Action for JP Application No. 2023-017951, mailed on Mar. 18, 2025 with English Translation.

*Primary Examiner* — Nicholas Augustine
(74) *Attorney, Agent, or Firm* — Sughrue Mion, PLLC

(57) ABSTRACT

Provided is a virtual input device that includes an input/output unit that acquires image data captured by a camera of a virtual reality display device and output display information to be displayed on a display of the virtual reality display device to the virtual reality display device, a video analysis unit that analyzes the image data to specify a position at which a virtual terminal is to be displayed, and a display information generation unit that generates the display information including the virtual terminal based on user information of a user wearing the virtual reality display device.

10 Claims, 23 Drawing Sheets

(56) References Cited

U.S. PATENT DOCUMENTS

| | | | | | |
|---|---|---|---|---|---|
| 6,079,982 | A * | 6/2000 | Meader | A63F 13/54 | 434/30 |
| 6,119,147 | A * | 9/2000 | Toomey | G06Q 10/109 | 719/329 |
| 6,179,619 | B1 * | 1/2001 | Tanaka | A63G 7/00 | 472/60 |
| 6,219,045 | B1 * | 4/2001 | Leahy | H04L 67/10 | 709/204 |
| 6,243,091 | B1 * | 6/2001 | Berstis | G06F 3/04815 | 715/205 |
| 6,271,843 | B1 * | 8/2001 | Lection | G06T 15/00 | 715/848 |
| 6,362,817 | B1 * | 3/2002 | Powers | G06T 17/00 | 345/428 |
| 6,396,522 | B1 * | 5/2002 | Vu | G06F 3/04845 | 715/848 |
| 6,414,679 | B1 * | 7/2002 | Miodonski | G06T 13/00 | 707/999.005 |
| 6,570,563 | B1 * | 5/2003 | Honda | A63F 13/352 | 345/473 |
| 6,573,903 | B2 * | 6/2003 | Gantt | G06F 30/10 | 345/619 |
| 6,590,593 | B1 * | 7/2003 | Robertson | G06F 3/04815 | 715/848 |
| 6,621,508 | B1 * | 9/2003 | Shiraishi | G06F 3/0481 | 715/764 |
| 6,690,393 | B2 * | 2/2004 | Heron | G06T 19/00 | 715/848 |
| 6,784,901 | B1 * | 8/2004 | Harvey | H04L 67/02 | 715/848 |
| 6,961,055 | B2 * | 11/2005 | Doak | A63F 13/63 | 345/677 |
| 7,119,819 | B1 * | 10/2006 | Robertson | G06F 3/04815 | 715/848 |
| 7,382,288 | B1 * | 6/2008 | Wilson | G08G 5/21 | 340/972 |
| 7,414,629 | B2 * | 8/2008 | Santodomingo | G06T 17/05 | 345/582 |
| 7,467,356 | B2 * | 12/2008 | Gettman | G06Q 30/02 | 715/850 |
| 7,542,040 | B2 * | 6/2009 | Templeman | G06T 13/40 | 345/474 |
| 7,653,877 | B2 * | 1/2010 | Matsuda | G06F 16/957 | 463/32 |
| 7,663,625 | B2 * | 2/2010 | Chartier | G05B 19/41805 | 700/182 |
| 7,746,343 | B1 * | 6/2010 | Charaniya | G06N 7/01 | 345/428 |
| 7,788,323 | B2 * | 8/2010 | Greenstein | G06Q 10/10 | 715/744 |
| 7,804,507 | B2 * | 9/2010 | Yang | H04N 13/344 | 345/633 |
| 7,814,429 | B2 * | 10/2010 | Buffet | G06Q 10/10 | 715/763 |
| 7,817,150 | B2 * | 10/2010 | Reichard | G06T 15/20 | 715/705 |
| 7,844,724 | B2 * | 11/2010 | Van Wie | H04L 67/131 | 709/227 |
| 9,244,533 | B2 * | 1/2016 | Friend | G09B 21/009 | |
| 9,696,795 | B2 * | 7/2017 | Marcolina | G06T 17/10 | |
| 9,996,797 | B1 * | 6/2018 | Holz | G06F 3/017 | |
| 10,516,853 | B1 * | 12/2019 | Gibson | H04N 7/157 | |
| 11,417,054 | B1 | 8/2022 | Tanner et al. | | |
| 2001/0018667 | A1 * | 8/2001 | Kim | G06Q 30/0277 | 705/14.73 |
| 2002/0095463 | A1 * | 7/2002 | Matsuda | G06F 16/957 | 709/204 |
| 2002/0113820 | A1 * | 8/2002 | Robinson | G06F 16/954 | 715/764 |
| 2004/0113887 | A1 * | 6/2004 | Pair | G09B 25/08 | 345/156 |
| 2004/0193441 | A1 * | 9/2004 | Altieri | A63F 13/216 | 709/203 |
| 2005/0093719 | A1 * | 5/2005 | Okamoto | G01C 21/3697 | 705/14.62 |
| 2005/0128212 | A1 * | 6/2005 | Edecker | G06T 17/05 | 345/581 |
| 2008/0030429 | A1 * | 2/2008 | Hailpern | G06T 7/73 | 345/8 |
| 2008/0125218 | A1 * | 5/2008 | Collins | G06Q 90/00 | 463/31 |
| 2008/0235570 | A1 * | 9/2008 | Sawada | G06Q 10/10 | 356/3 |
| 2008/0246693 | A1 * | 10/2008 | Hailpern | G06T 7/246 | 345/8 |
| 2009/0076791 | A1 * | 3/2009 | Rhoades | A63F 13/53 | 703/21 |
| 2009/0091583 | A1 * | 4/2009 | McCoy | G06T 19/006 | 345/419 |
| 2009/0287728 | A1 * | 11/2009 | Martine | G06Q 30/02 | 715/810 |
| 2009/0300528 | A1 * | 12/2009 | Stambaugh | G06F 3/04817 | 715/764 |
| 2010/0070378 | A1 * | 3/2010 | Trotman | G06Q 30/02 | 705/26.1 |
| 2010/0115428 | A1 * | 5/2010 | Shuping | G06F 3/0481 | 715/277 |
| 2010/0205541 | A1 * | 8/2010 | Rapaport | G06Q 30/02 | 715/753 |
| 2010/0214284 | A1 * | 8/2010 | Rieffel | G06T 17/00 | 382/154 |
| 2010/0274567 | A1 * | 10/2010 | Carlson | G06Q 40/02 | 235/487 |
| 2010/0274627 | A1 * | 10/2010 | Carlson | G06Q 20/20 | 705/16 |
| 2011/0010636 | A1 * | 1/2011 | Hamilton, II | G06Q 10/10 | 705/26.7 |
| 2011/0041083 | A1 * | 2/2011 | Gabai | G06Q 10/00 | 715/753 |
| 2011/0225536 | A1 * | 9/2011 | Shams | H04N 23/55 | 715/773 |
| 2012/0249741 | A1 * | 10/2012 | Maciocci | G06T 19/006 | 348/51 |
| 2013/0304729 | A1 * | 11/2013 | Jiang | G06F 16/9558 | 707/723 |
| 2014/0035819 | A1 | 2/2014 | Griffin | | |
| 2014/0082526 | A1 * | 3/2014 | Park | H04L 65/403 | 715/757 |
| 2014/0282105 | A1 * | 9/2014 | Nordstrom | G06F 3/016 | 715/753 |
| 2017/0185261 | A1 * | 6/2017 | Perez | G06F 3/04845 | |
| 2017/0243403 | A1 * | 8/2017 | Daniels | G06F 3/1454 | |
| 2018/0131907 | A1 * | 5/2018 | Schmirler | G05B 23/0216 | |
| 2018/0357472 | A1 * | 12/2018 | Dreessen | G06V 20/49 | |
| 2019/0087015 | A1 * | 3/2019 | Lam | A63F 13/213 | |
| 2020/0110928 | A1 * | 4/2020 | Al Jazaery | G06N 3/0464 | |
| 2020/0117267 | A1 * | 4/2020 | Gibson | G06F 3/011 | |
| 2020/0117270 | A1 * | 4/2020 | Gibson | G06F 3/011 | |
| 2020/0309944 | A1 * | 10/2020 | Thoresen | G06T 19/006 | |
| 2020/0356610 | A1 * | 11/2020 | Coimbra | G06F 16/954 | |
| 2020/0368616 | A1 * | 11/2020 | Delamont | H04N 13/239 | |
| 2021/0008413 | A1 * | 1/2021 | Asikainen | G06F 3/0304 | |
| 2021/0041951 | A1 * | 2/2021 | Gibson | G06T 7/74 | |

FOREIGN PATENT DOCUMENTS

| | | | |
|---|---|---|---|
| JP | 2014-192687 | A | 10/2014 |
| JP | 2016-177658 | A | 10/2016 |
| JP | 6826029 | B | 2/2021 |
| JP | 7176792 | B1 | 11/2022 |
| WO | 2018/225149 | A1 | 12/2018 |

* cited by examiner

| SCENARIO | KEY |
|----------|-----|
| S1 | K1 |
|  | K2 |
|  | K3 |
| ... | ... |

| KEY | DEGREE OF INTEREST |
|-----|--------------------|
| K1 | 150 |
| K2 | 200 |
| K3 | 50 |
| ... | ... |

| KEY | IGNORE |
|------|--------|
| K1 | |
| K2 | |
| K3 | |
| K4 | YES |
| K5 | YES |
| K6 | YES |
| K7 | YES |
| ... | ... |

Fig.20

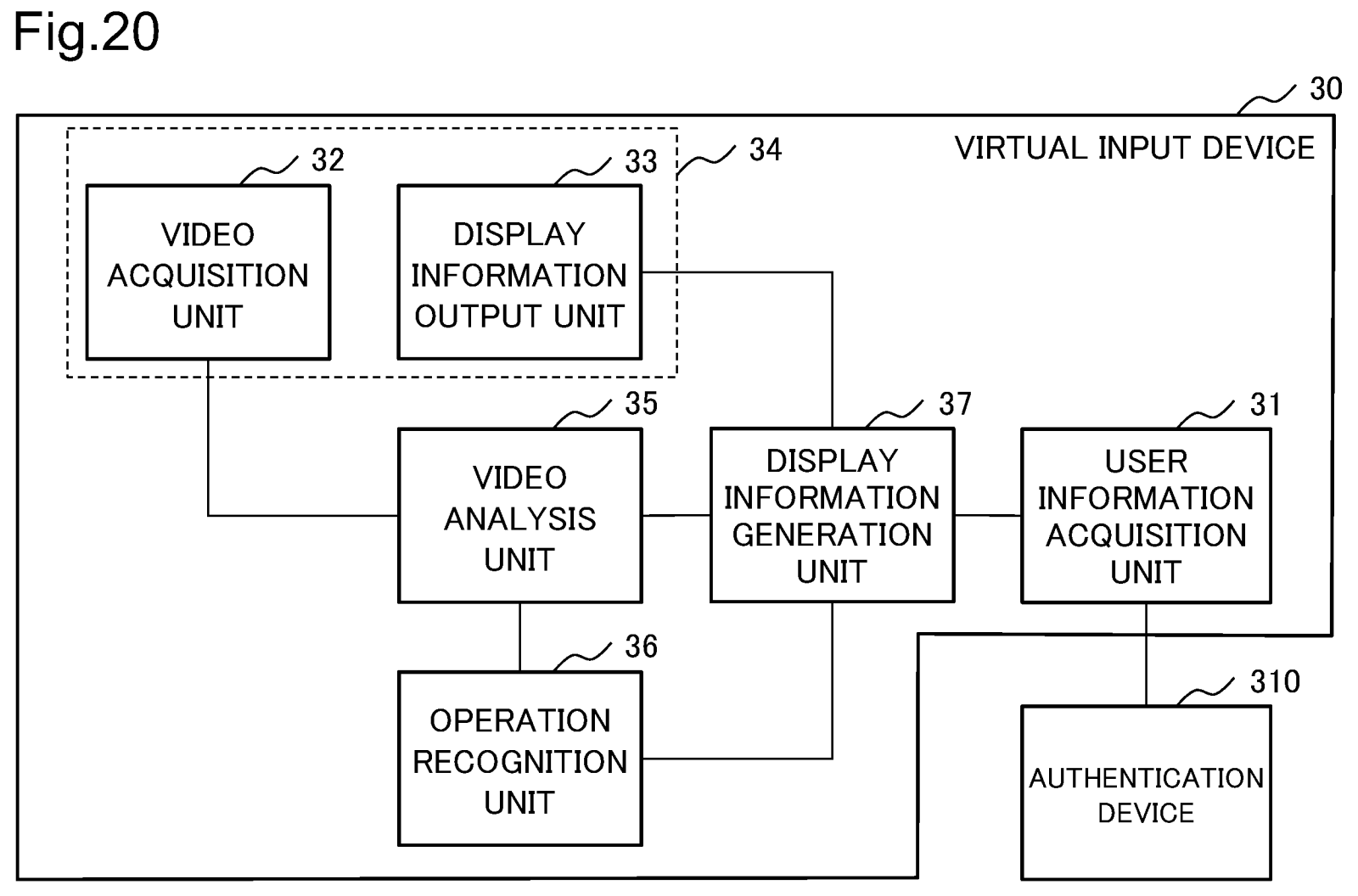

VIRTUAL INPUT DEVICE    30

31
USER INFORMATION ACQUISITION UNIT

310
AUTHENTICATION DEVICE

37
DISPLAY INFORMATION GENERATION UNIT 34
33
DISPLAY INFORMATION OUTPUT UNIT

35
VIDEO ANALYSIS UNIT

36
OPERATION RECOGNITION UNIT

32
VIDEO ACQUISITION UNIT

Fig.21

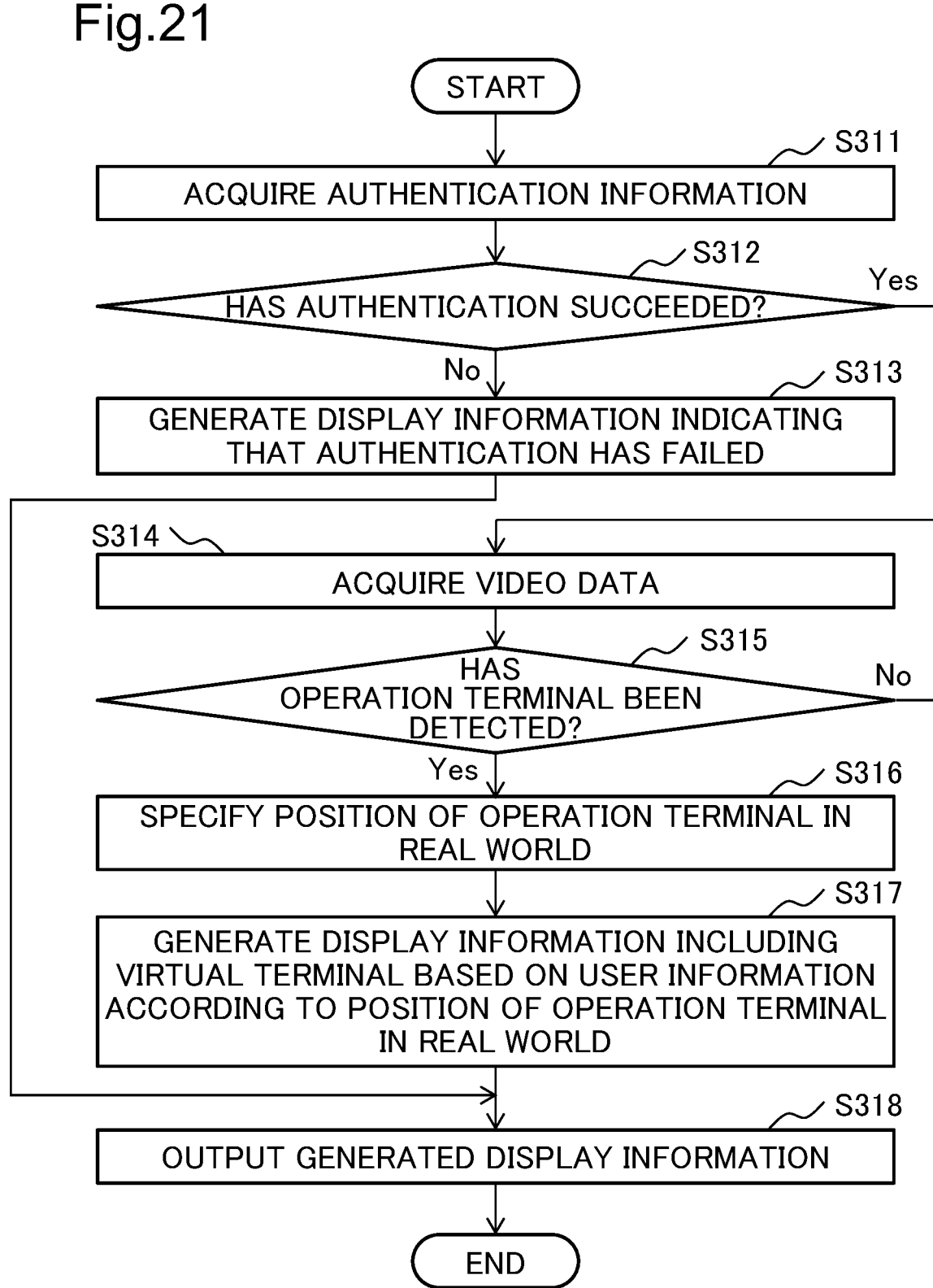

START

ACQUIRE AUTHENTICATION INFORMATION    ~ S311

HAS AUTHENTICATION SUCCEEDED?    ~ S312    Yes

No

GENERATE DISPLAY INFORMATION INDICATING THAT AUTHENTICATION HAS FAILED    ~ S313

S314

ACQUIRE VIDEO DATA

HAS OPERATION TERMINAL BEEN DETECTED?    ~ S315    No

Yes

SPECIFY POSITION OF OPERATION TERMINAL IN REAL WORLD    ~ S316

GENERATE DISPLAY INFORMATION INCLUDING VIRTUAL TERMINAL BASED ON USER INFORMATION ACCORDING TO POSITION OF OPERATION TERMINAL IN REAL WORLD    ~ S317

OUTPUT GENERATED DISPLAY INFORMATION    ~ S318

END

Fig.23

VIRTUAL INPUT DEVICE, VIRTUAL INPUT SYSTEM, VIRTUAL INPUT METHOD, AND RECORDING MEDIUM

This application is based upon and claims the benefit of priority from Japanese Patent Application No. 2023-017951, filed on Feb. 8, 2023, the disclosure of which is incorporated herein in its entirety by reference.

TECHNICAL FIELD

The present disclosure relates to a virtual input device, a virtual input system, a virtual input method, and a recording medium.

BACKGROUND ART

A virtual reality display device including a display that can be worn on a human body, such as a head mounted display (HMD), has been developed. By mounting such a device, visual information displayed on the display can be visually recognized.

PTL 1 (JP 6826029 B2) discloses a method of displaying a virtual reality environment on an HMD. In the method of PTL 1, it is determined whether an opportunity exists in a virtual reality environment for user interaction with a real-world object. In the method of PTL 1, a real-world object positioned within a real-world viewpoint of a user of the head mounted display is detected in response to the determined opportunity. In the method of PTL 1, an image of the detected real-world physical object is displayed on the head mounted display.

It is possible to implement a user interface that receives an operation in a virtual space displayed on the display by using the method of PTL 1. For example, a user interface in which predetermined input processing is executed can be implemented when the user wearing the HMD performs an operation on visual information constructed in the virtual space. In such a method, it is necessary to keep paying attention and concentration in order to keep visually recognizing the visual information displayed on the display of the HMD. Therefore, there is a possibility that a touch panel, a switch, or the like constructed in the virtual space is overlooked due to fatigue caused by continuation of the operation using the virtual reality display device, and an erroneous operation is performed.

An object of the present disclosure is to provide a virtual input device, a virtual input system, a virtual input method, and a program capable of implementing a continuous operation on a virtual terminal displayed in a virtual space.

SUMMARY

A virtual input device according to an aspect of the present disclosure includes an input/output unit that acquires image data captured by a camera of a virtual reality display device and output display information to be displayed on a display of the virtual reality display device to the virtual reality display device, a video analysis unit that analyzes the image data to specify a position at which a virtual terminal is to be displayed, and a display information generation unit that generates the display information including the virtual terminal based on user information of a user who uses the virtual reality display device.

A virtual input method according to an aspect of the present disclosure includes acquiring image data captured by a camera of a virtual reality display device, analyzing the image data to specify a position at which a virtual terminal is to be displayed, generating display information including the virtual terminal based on user information of a user who uses the virtual reality display device, and outputting the generated display information to the virtual reality display device to display an image based on the display information on a display of the virtual reality display device.

A program according to an aspect of the present disclosure causes a computer to execute processing of acquiring image data captured by a camera of a virtual reality display device, analyzing the image data to specify a position at which a virtual terminal is to be displayed, generating display information including the virtual terminal based on user information of a user who uses the virtual reality display device, and outputting the generated display information to the virtual reality display device to display an image based on the display information on a display of the virtual reality display device.

BRIEF DESCRIPTION OF THE DRAWINGS

Exemplary features and advantages of the present invention will become apparent from the following detailed description when taken with the accompanying drawings in which:

FIG. 7 is a block diagram illustrating an example of a configuration of a virtual input device included in the virtual input system according to the present disclosure;

FIG. 12 is a table illustrating an example of an association list used by the virtual input device according to the present disclosure;

FIG. 14 is a table illustrating an example of the association list used by the virtual input device according to the present disclosure;

FIG. 16 is a table illustrating an example of the association list used by the virtual input device according to the present disclosure;

FIG. 20 is a block diagram illustrating an example of a configuration of a virtual input device according to the present disclosure;

FIG. 21 is a flowchart for describing an example of an operation of the virtual input device according to the present disclosure;

FIG. 23 is a block diagram illustrating an example of a configuration of hardware that executes processing according to the present disclosure.

EXAMPLE EMBODIMENT

Figure 1:
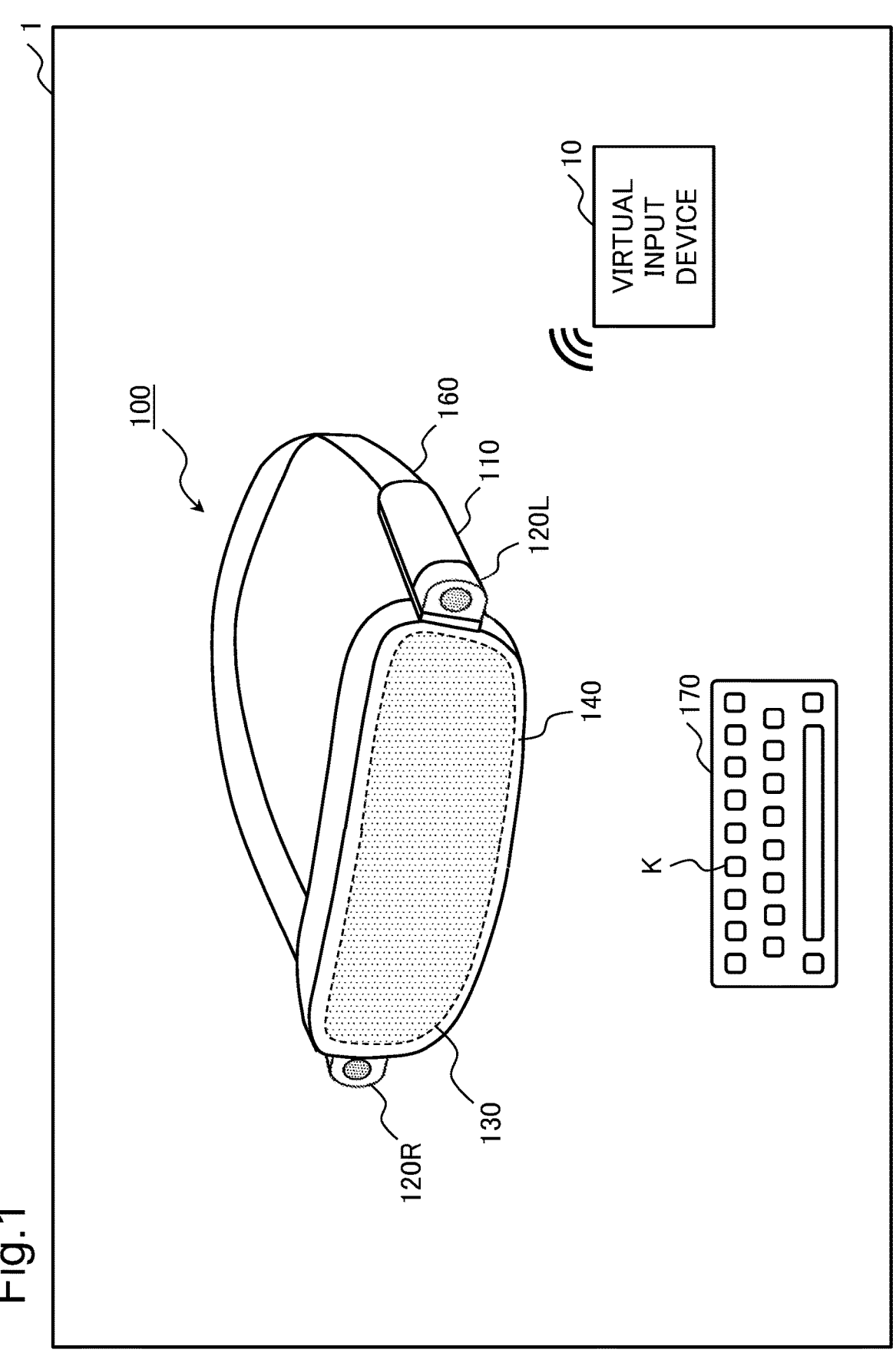
FIG. 1 is a conceptual view illustrating an example of a configuration of a virtual input system according to the present disclosure.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a virtual input system according to a first example embodiment will be described with reference to the drawings. The virtual input system of the present example embodiment includes a virtual reality display device including a display that can be worn on a human body, such as a head mounted display (HMD). In the following, an example in which the virtual reality display device is implemented by a non-transparent HMD will be described on the assumption of a use scene of virtual reality (VR). The virtual input system of the present example embodiment is also applied to use scenes of augmented reality (AR), mixed reality (MR), and the like. Therefore, the virtual reality display device may be a transparent HMD for some use scenes. In the present example embodiment, an example in which the virtual input system includes the virtual reality display device and a virtual input device will be described. Hereinafter, an example in which the virtual reality display device and the virtual input device are implemented by different devices will be described. The virtual input device may be built in the virtual reality display device.

The virtual reality display device according to the present example embodiment includes a pair of cameras configured to image a real world within a range of a field of view of a user, and a display configured to display virtual reality visually recognized by the user. In the following description, a right eye side camera is given an alphabet of R (right), and a left eye side camera is given an alphabet of L (left) in order to distinguish the pair of cameras. In a case where the right eye side camera and the left eye side camera are not distinguished, R and L at the end of the reference numerals may be omitted.

(Configuration)

FIG. 1 is a conceptual diagram illustrating an example of a configuration of a virtual input system 1 according to the present example embodiment. The virtual input system 1 of the present example embodiment includes a virtual input device 10, a virtual reality display device 100, and an operation terminal 170. The virtual input device 10 is connected to the virtual reality display device 100 and the operation terminal 170 in a wired or wireless manner. The virtual input device 10 may be built in the virtual reality display device 100. A method for connection between the virtual input device 10, the virtual reality display device 100, and the operation terminal 170 is not particularly limited. As will be described later, the operation terminal 170 may be implemented by a mock up having no input function.

The virtual reality display device 100 includes a control device 110, a camera 120R, a camera 120L, and a display unit 130 (a display). Furthermore, the virtual reality display device 100 includes a driver to be described later. It is sufficient if the control device 110 is disposed in association with at least one of the camera 120R or the camera 120L. The camera 120R and the camera 120L have similar configurations. Hereinafter, the camera 120R and the camera 120L may be referred to as the cameras 120 without being distinguished. In addition, the virtual reality display device 100 includes a cover 140 and a band 160. The display unit 130 is fixed to a human body side of the cover 140. The band 160 is a band for fixing the virtual reality display device 100 to the head.

The virtual reality display device 100 captures an image or a video of an area in front of the virtual reality display device 100 by using the camera 120. The virtual reality display device 100 transmits the image captured by the camera 120 to the virtual input device 10. In the example of FIG. 1, the virtual reality display device 100 includes two cameras 120. A single camera 120 or three cameras 120 may be provided in the virtual reality display device 100. Positions where the cameras 120 are disposed do not have to be both sides of the cover 140. For example, the camera 120 may be disposed on, under, or in front of the cover 140. For example, when the cameras 120 are disposed at positions aligned with the eyes of a person, it is possible to capture an image close to an image visually recognized by the person.

The camera 120L and the camera 120R are a pair of cameras that images an outside view. The camera 120L and the camera 120R constitute a stereo camera. The camera 120L and the camera 120R generate image data of the captured outside view. It is possible to measure information regarding a depth direction of the outside view in the real world beyond the cover 140 (display unit 130) for the user wearing the virtual reality display device 100 from a position in the image data captured by each of the camera 120L and the camera 120R. For example, the virtual reality display device 100 can calculate a distance between the virtual reality display device 100 and a target object from a difference between pixel positions of the pieces of image data captured by the camera 120L and the camera 120R. The camera 120L and the camera 120R can be implemented by general digital cameras. Furthermore, the camera 120L and the camera 120R may be implemented by infrared cameras or ultraviolet cameras.

In addition, the virtual reality display device 100 acquires display information from the virtual input device 10. The display information includes an image to be displayed on the display unit 130 and coordinates at which the image is to be displayed. The virtual reality display device 100 displays the image based on the acquired display information. The image displayed on the display unit 130 of the virtual reality display device 100 corresponds to the real world beyond the cover 140 (display unit 130) for the user. Therefore, the image at the position in the real world is displayed on the display unit 130 of the virtual reality display device 100. In the present example embodiment, an image (virtual keyboard) associated to the operation terminal 170 at a position in the real world is displayed on the display unit 130 of the virtual reality display device 100.

Figure 2:
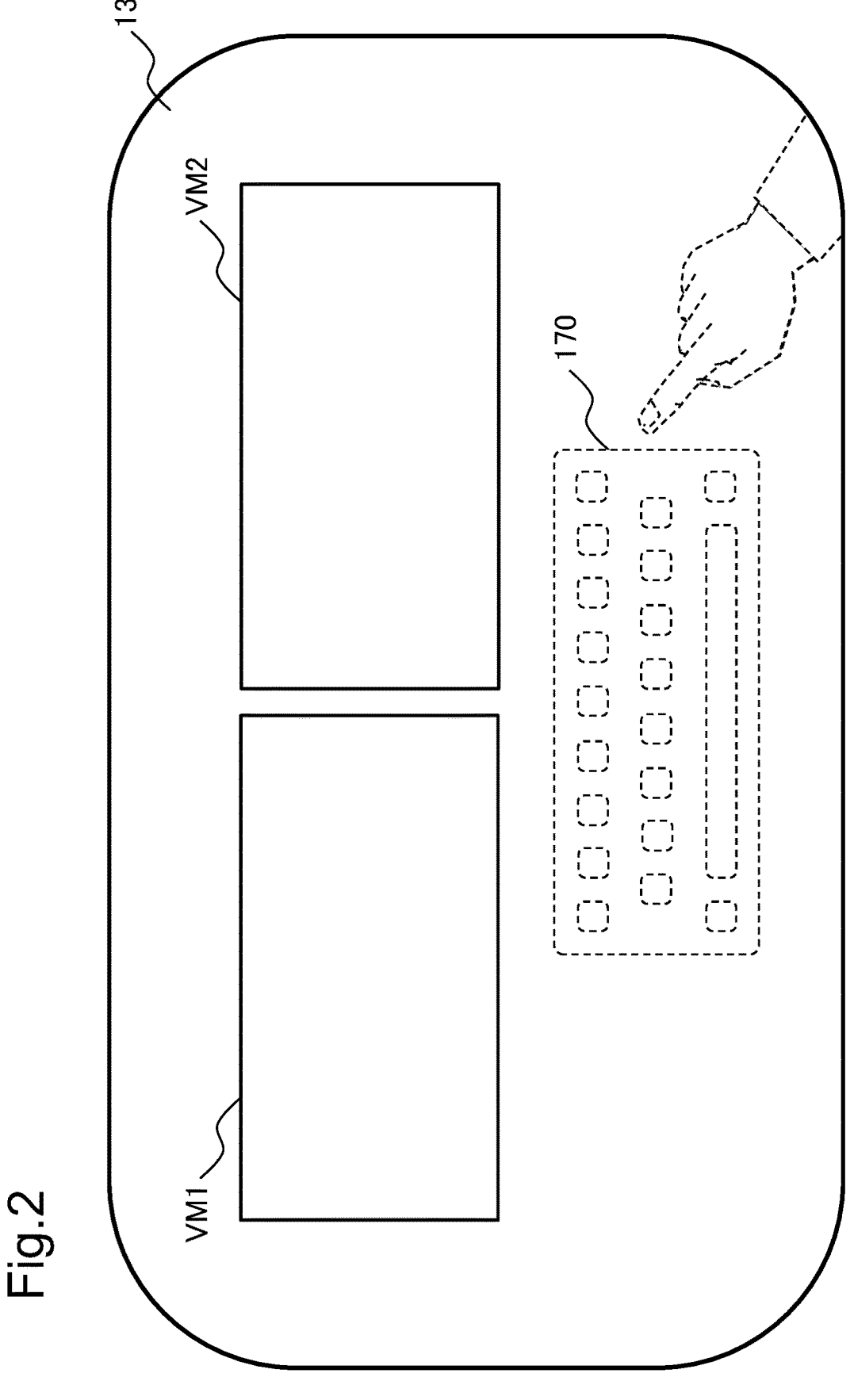
FIG. 2 is a conceptual view illustrating an example of an image displayed on a display of a virtual reality display device included in the virtual input system according to the present disclosure.

FIG. 2 is a conceptual diagram illustrating an example of the image displayed on the display unit 130 of the virtual reality display device 100. In the example of FIG. 2, a virtual monitor VM1 and a virtual monitor VM2 are displayed on the display unit 130. Furthermore, in FIG. 2, the positions of the operation terminal 170 and the hand of the user disposed in the real world beyond the display unit 130 are indicated by broken lines. Information to be used by the user is displayed on the virtual monitor VM1 and the virtual monitor VM2 (hereinafter, referred to as the virtual monitor VM). For example, an instruction or notification for the user is displayed on the virtual monitor VM. The user can perform an input according to the instruction or notification displayed on the virtual monitor VM by using the operation terminal 170.

Figure 3:
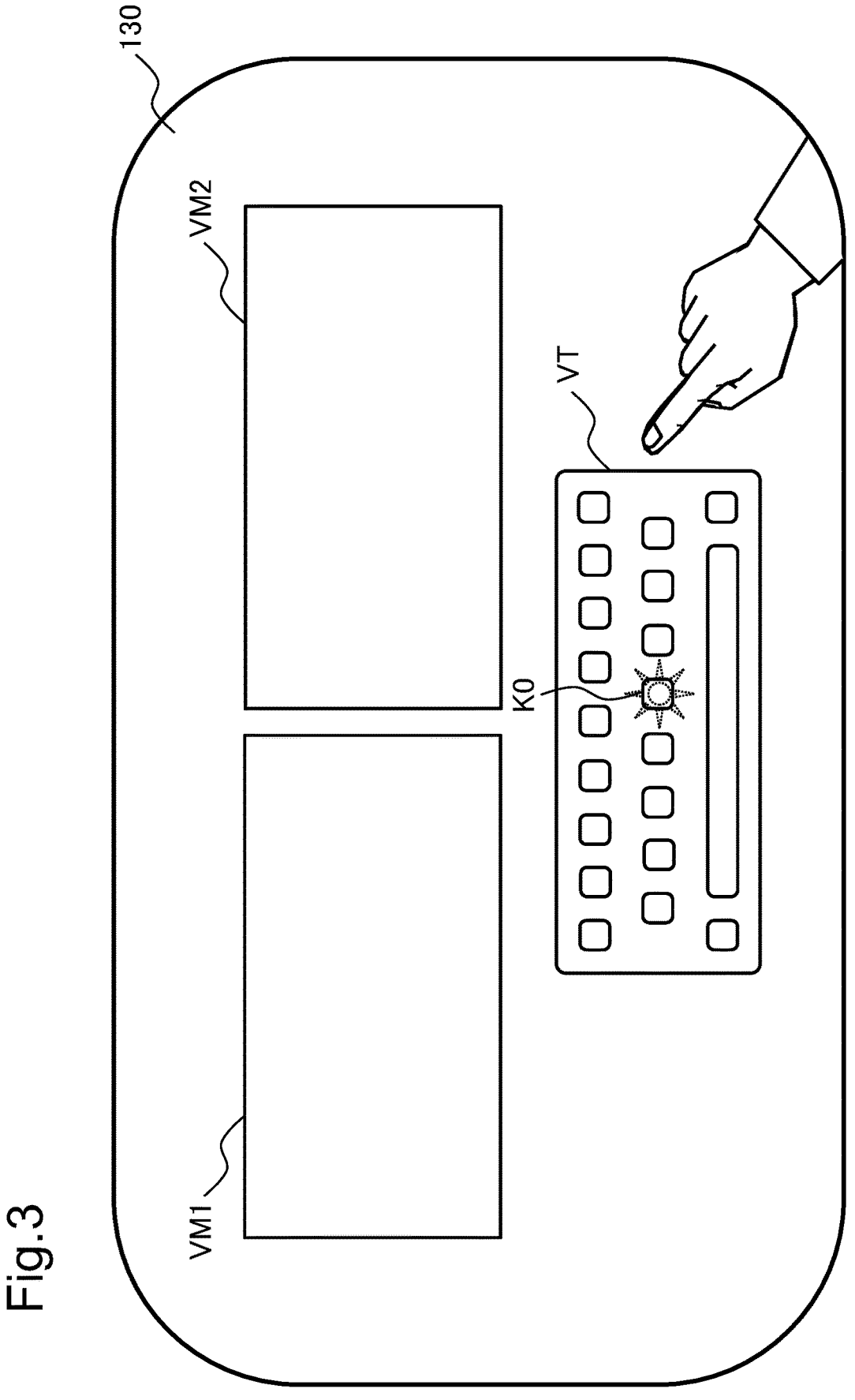
FIG. 3 is a conceptual view illustrating an example of a virtual terminal displayed on the display of the virtual reality display device included in the virtual input system according to the present disclosure.

FIG. 3 is a conceptual diagram illustrating an example of the image displayed on the display unit 130 of the virtual reality display device 100. In the example of FIG. 3, the virtual monitor VM1 and the virtual monitor VM2 (virtual monitor VM) are displayed on the display unit 130. Furthermore, in the example of FIG. 3, a virtual terminal VT is displayed on the display unit 130 in association with the position of the operation terminal 170 disposed in the real world beyond the display unit 130. The display unit 130 displays an image of the hand captured by the camera 120 in association with the position of the hand of the user in the real world. FIG. 3 illustrates a display state in which a key K0 to be selected next is highlighted. The displayed image of the hand may be an actual image of the hand or a picture imitating the hand. For example, the virtual terminal VT and the hand are displayed on the display unit 130 at a timing at which the operation terminal 170 and the hand are imaged by the camera 120.

Key arrangement and key binding of the virtual terminal VT may be set according to user information. For example, the key arrangement and the key binding of the virtual terminal VT are set according to an organization to which the user belongs. In a case where the key arrangement and the key binding of the virtual terminal VT are set for each organization to which the user belongs, work can be made efficient according to the needs of each organization. For example, the key arrangement and the key binding of the virtual terminal VT are set for each user. In a case where the key arrangement and the key binding of the virtual terminal VT are set for each user, the work can be made efficient according to the needs of each user.

Figure 4:
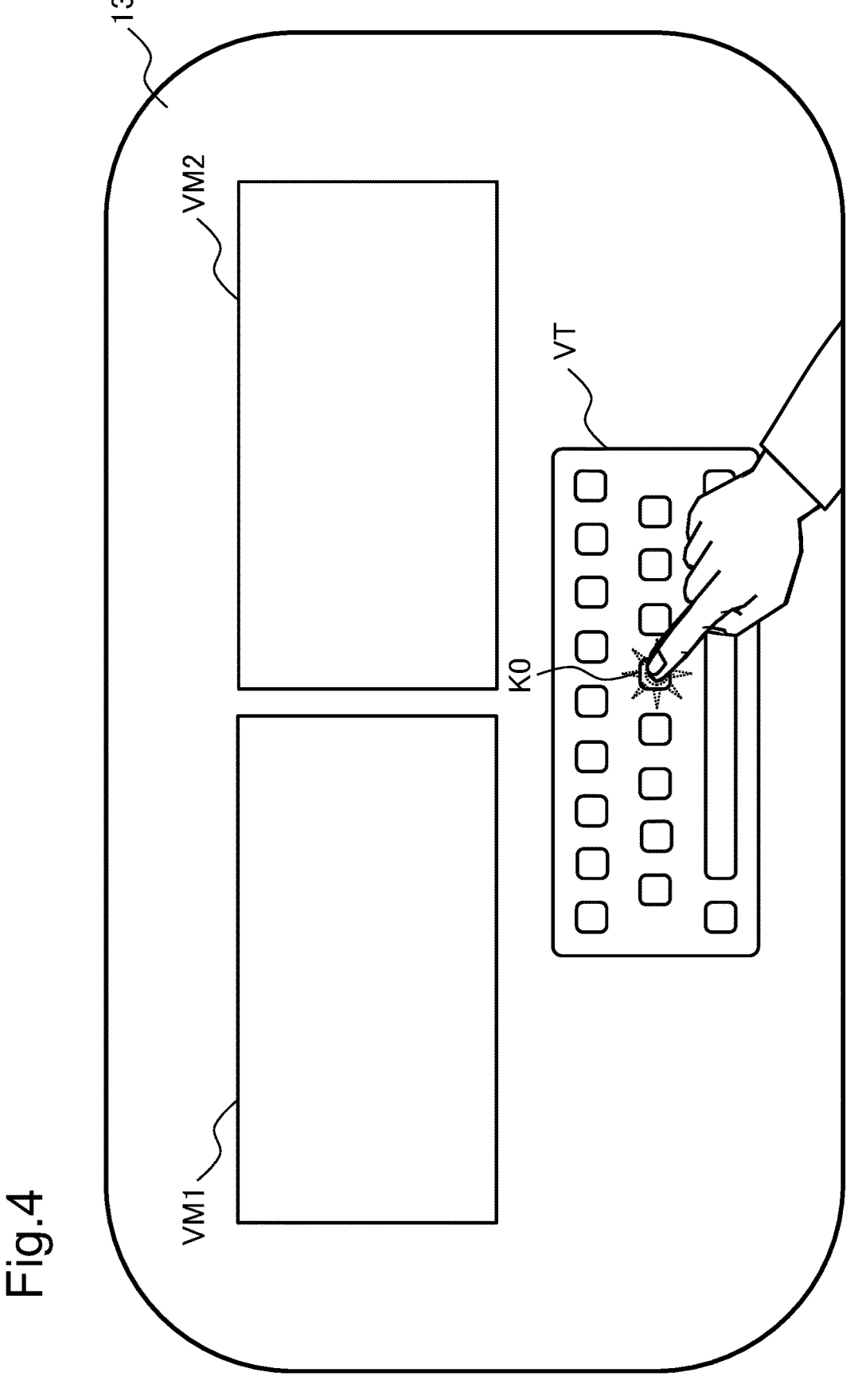
FIG. 4 is a conceptual view illustrating an example of an operation for the virtual terminal displayed on the display of the virtual reality display device included in the virtual input system according to the present disclosure.

FIG. 4 is a conceptual diagram illustrating another example of the image displayed on the display unit 130 of the virtual reality display device 100. FIG. 4 illustrates a state in which the user performs an input operation on the highlighted key K0. The user wearing the virtual reality display device 100 performs the input operation on the highlighted key K0 on the virtual terminal VT displayed on the display unit 130. As a result, the user presses the key K0 of the operation terminal 170 disposed in the real world.

Figure 5:
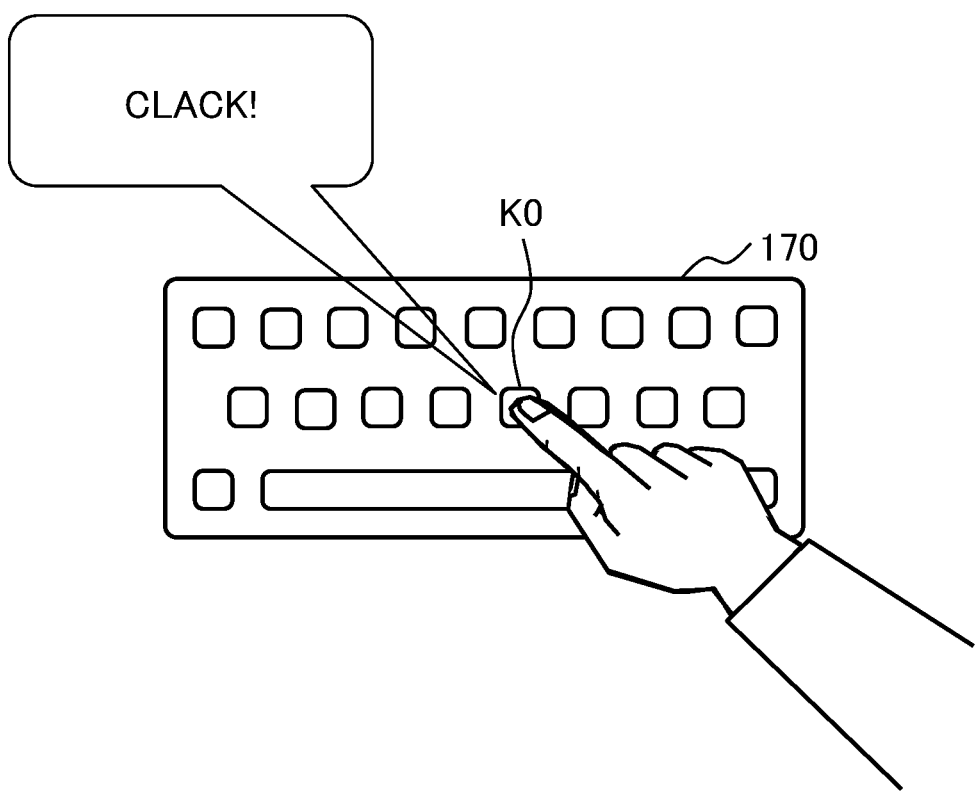
FIG. 5 is a conceptual view illustrating an example of an operation for a real-world operation terminal on which the virtual terminal displayed on the display of the virtual reality display device included in the virtual input system according to the present disclosure is superimposed.

FIG. 5 is a conceptual diagram illustrating an example of the input operation for the operation terminal 170 disposed in the real world. As illustrated in FIG. 4, when the user attempts to perform the input operation on the virtual terminal VT displayed on the display unit 130, the input operation for the operation terminal 170 disposed in the real world is performed. An input to the virtual reality display device 100 is performed by the input operation for the operation terminal 170 disposed in the real world. The user operates the operation terminal 170 with a sense of operating the virtual terminal VT. Therefore, the user can operate the virtual terminal VT with a sense of operating the operation terminal 170.

The operation terminal 170 is a terminal device that receives an input to the virtual reality display device 100. The operation terminal 170 is not limited as long as an input operation such as a key input can be performed. For example, the operation terminal 170 is a general-purpose keyboard. For example, the operation terminal 170 may be a dedicated terminal customized for an organization or work.

At least one mark for detecting the position or orientation of the operation terminal 170 is attached to the operation terminal 170. The mark may be a mark that can be detected by visible light or a mark that can be detected by infrared light. Furthermore, the mark may be a feature extracted from the surface of the operation terminal 170 instead of a mark intentionally attached. For example, the mark may be a scratch, a character, or the like that can be recognized and identified by a machine reading technology such as an object fingerprint authentication technology. The real world and the virtual space are displayed in association with each other by aligning a reference position of the mark attached to the operation terminal 170 with a reference position of the virtual terminal VT. By using a plurality of reference points, the operation terminal 170 and the virtual terminal VT can be displayed in a superimposed manner even when the operation terminal 170 disposed in the real world rotates at any angle. In addition, the inclination of the virtual terminal VT may be calculated in conjunction with a sensor that detects the inclination of the operation terminal 170. For example, in a case where the operation terminal 170 disposed in the real world is detected by image recognition, and the detected operation terminal 170 and the reference position of the virtual terminal VT are aligned, the mark does not have to be attached to the operation terminal 170. For example, in a case where a feature point such as a vertex of the operation terminal 170 is detected, the position and angle of the operation terminal 170 can be calibrated.

At least one key K that receives an input to the virtual reality display device 100 is disposed in the operation terminal 170. For example, the operation terminal 170 is implemented by a general keyboard. For example, a symbol such as an alphabet or a number, or a specific function is assigned to the key K. The specific function may be assigned to the key K in advance, or may be assigned according to a user setting. For example, the specific function may be assigned to the key K according to the user who uses the virtual reality display device 100, a group to which the user belongs, or a role of the user. For example, the operation terminal 170 may be a dedicated terminal specialized for inputting the specific function.

For example, the operation terminal 170 can be applied to a dedicated terminal used in a fire command center. The dedicated terminal used in a fire command center has a different key with a high use frequency for each organization. Therefore, even in the same dedicated terminal, the dedicated terminal is customized for each organization in order to make a key having a high use frequency stand out. Such customization is performed for each fire department or each department in the fire department. In an actual use scene, it is required to arrange a key function for each individual. In a case of using the virtual input system 1 of the present example embodiment, the display of the virtual terminal VT displayed in the virtual space can be changed, and it is thus not necessary to customize the dedicated terminal for each organization.

For example, the operation terminal 170 does not have to be disposed in the real world. In this case, an input operation for the virtual terminal VT may be performed according to the position or motion of the finger or hand of the user in the real world imaged by the camera 120. In a case where a key of the virtual terminal VT and the position or motion of the finger or hand of the user are associated with each other, an input to the virtual terminal VT can be implemented.

For example, instead of the operation terminal 170, a mock up for feeding back a tactile sensation for a key operation may be disposed in the real world. The mock up may be of a similar design to the actual terminal device, or may be plain. In this case, the user who touches the mock up disposed in the real world can perform an input operation for the virtual terminal VT with a sense of actually operating the operation terminal disposed in the real world. The mock up is not particularly limited as long as a tactile sensation for a key operation is fed back. For example, a virtual operation input may be made using a general-purpose mock up that feeds back a tactile sensation for a key operation. In such a configuration, the mock up and the virtual terminal VT may have different key arrangements. In addition, the key arrangement of the virtual terminal VT may be changed and displayed on the display unit 130 in association with the key arrangement of the mock up.

In the examples of FIGS. 2 to 5, an example in which an input is performed using the virtual terminal VT displayed on the display unit 130 has been described. The virtual input system 1 of the present example embodiment may be configured in such a way that an input is performed according to an operation for the virtual monitor VM displayed on the display unit 130 without using the virtual terminal VT. With such a configuration, an input according to a purpose can be performed by an intuitive operation for the display information displayed on the virtual monitor VM.

[Virtual Reality Display Device]

Figure 6:
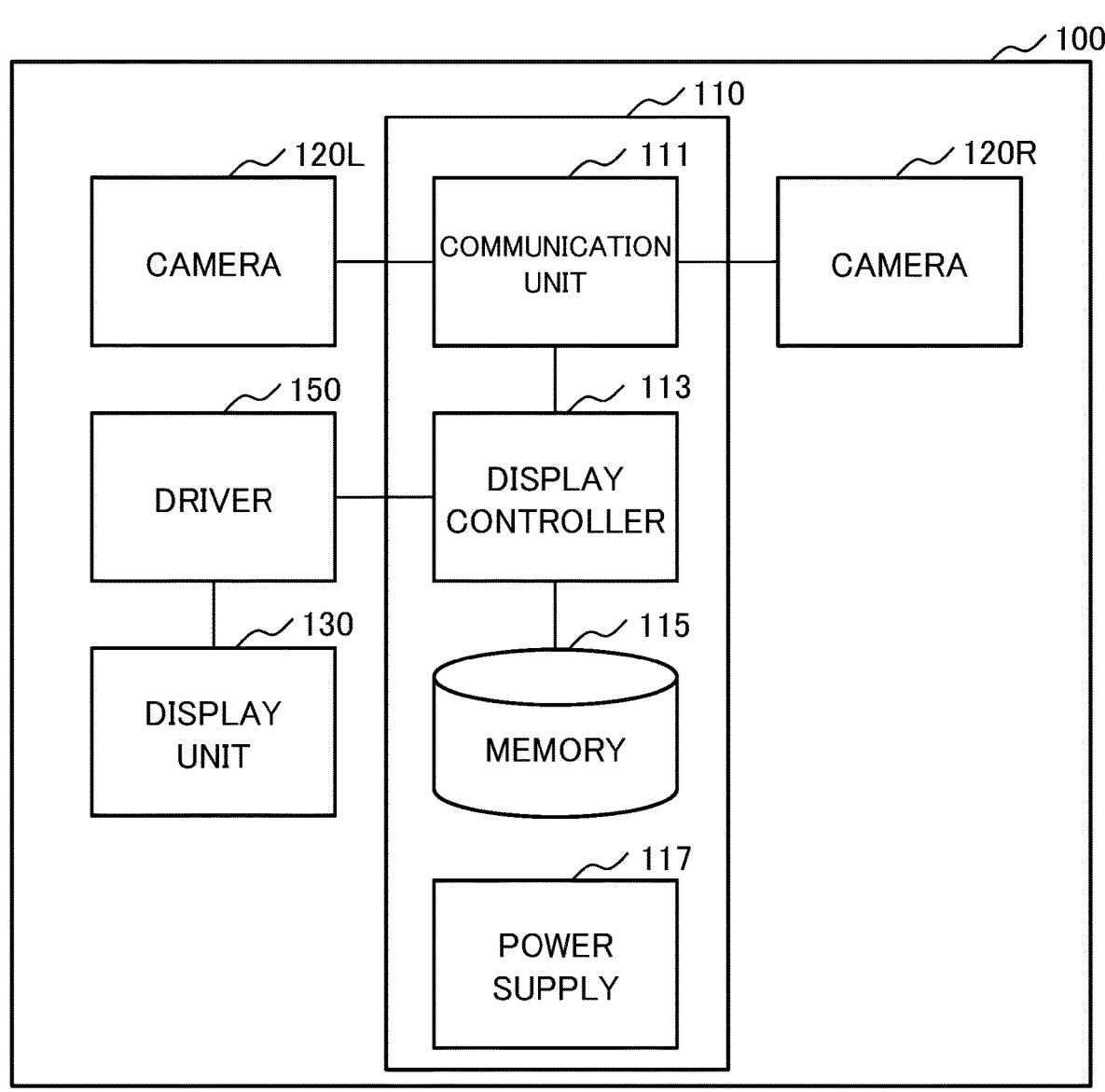
FIG. 6 is a block diagram illustrating an example of a configuration of the virtual reality display device included in the virtual input system according to the present disclosure.

Next, a detailed configuration of the virtual reality display device 100 will be described with reference to the drawings. FIG. 6 is a block diagram illustrating an example of the configuration of the virtual reality display device 100. The virtual reality display device 100 includes the control device 110, the camera 120R, the camera 120L, the display unit 130, and a driver 150. It is sufficient if the control device 110 is disposed in association with at least one of the camera 120R or the camera 120L. The camera 120R and the camera 120L have similar configurations. Hereinafter, the camera 120R and the camera 120L may be referred to as the cameras

120 without being distinguished. In addition, the virtual reality display device 100 includes a cover 140 and a band 160. The display unit 130 is fixed to a human body side of the cover 140. The band 160 is a band for fixing the virtual reality display device 100 to the head.

The control device 110 includes a communication unit 111, a display controller 113, a memory 115, and a power supply 117. For example, the control device 110 is disposed in association with at least one of the camera 120L or the camera 120R. The control device 110 is provided inside a housing. The control device 110 may be disposed on the cover 140 or the band 160. For example, the control device 110 is implemented by hardware including a central processing unit (CPU), a random access memory (RAM), a read only memory (ROM), a flash memory, and the like.

The communication unit 111 (communication means) is a communication interface that communicates with the virtual input device 10. The communication unit 111 transmits and receives data to and from the virtual input device 10. For example, the communication unit 111 is connected to the virtual input device 10 by wireless communication such as Bluetooth (registered trademark), Wi-Fi (registered trademark), or a wireless local area network (LAN). The communication unit 111 may be connected to the virtual input device 10 by a wireless method other than Bluetooth (registered trademark), Wi-Fi (registered trademark), or wireless LAN. Furthermore, the communication unit 111 may be connected to the virtual input device 10 via a wired cable as long as workability of the user is not affected.

The communication unit 111 is connected to the camera 120L and the camera 120R. The communication unit 111 acquires image data from the camera 120L and the camera 120R. The communication unit 111 transmits the acquired image data to the virtual input device 10. The communication unit 111 may be configured to transmit, to the virtual input device 10, video data including a plurality of pieces of temporally continuous image data (frames).

Furthermore, the communication unit 111 is connected to the display controller 113. The communication unit 111 receives the display information to be displayed on the display unit 130 from the virtual input device 10. The display information includes an image to be displayed on the display unit 130 and coordinates at which the image is to be displayed. The communication unit 111 outputs the received display information to the display controller 113.

The display controller 113 is connected to the communication unit 111, the memory 115, and the driver 150. The display controller 113 acquires, from the communication unit 111, the display information transmitted from the virtual input device 10. The display controller 113 acquires the image data based on the acquired display information from the memory 115. The display controller 113 controls the driver 150 in such a way that an image associated to the acquired display information or image data is displayed. For example, the display controller 113 controls the driver 150 in such a way that the image included in the display information transmitted from the virtual input device 10 and the image associated to the image data acquired from the memory 115 are superimposed.

The memory 115 is connected to the display controller 113. The memory 115 stores an image to be displayed on the display unit 130. For example, the memory 115 stores image data associated to the image to be displayed on the display unit 130. For example, the memory 115 stores image data associated to a shape or a character to be displayed on the display unit 130.

The power supply 117 is a secondary battery for driving the virtual input device 10. For example, the power supply 117 is a secondary battery that can supply power via a power cable. For example, the power supply 117 may be a secondary battery that can be charged by wireless power supply.

The display unit 130 is connected to the driver 150. The display unit 130 is a display that displays information visually recognized by the user. In the display unit 130, a plurality of pixels are arranged in an array in such a way that the shape and color in the real world can be expressed. The information visually recognized by the user is displayed on the display unit 130 under the control of the driver 150.

For example, the display unit 130 is implemented by a liquid crystal display or an organic electro-luminescence (EL) display. For example, the display unit 130 may be implemented by a micro light emitting diode (LED) display or an inorganic EL display. The form of the display unit 130 is not particularly limited as long as the display unit 130 is a display that can be visually recognized by the virtual reality display device 100.

The driver 150 is a driver that controls the display unit 130 to display an image. For example, the driver 150 includes a first drive circuit (not illustrated) that drives display in a horizontal direction and a second drive circuit (not illustrated) that drives display in a vertical direction. For example, the first drive circuit is disposed above the display unit 130. The first drive circuit sets a display position in the vertical direction. For example, the second drive circuit is disposed on a side of the display unit 130. The second drive circuit sets a display position in the horizontal direction. Pixels for forming an image can be displayed at any coordinates on the display unit 130 by driving the first drive circuit and the second drive circuit.

[Virtual Input Device]

Figure 7:
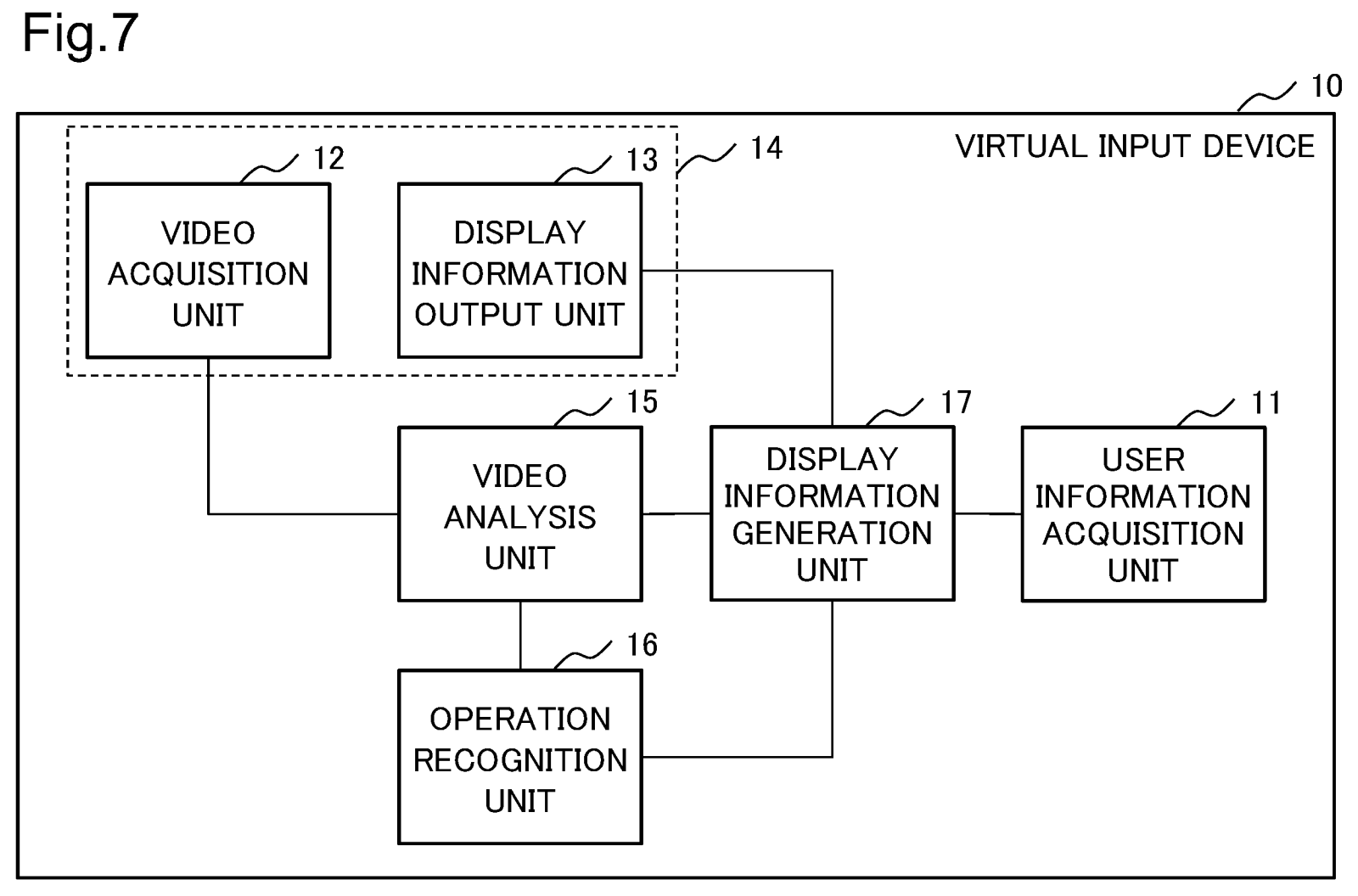

Next, a detailed configuration of the virtual input device 10 will be described with reference to the drawings. FIG. 7 is a block diagram illustrating an example of the configuration of the virtual input device 10. The virtual input device 10 includes a user information acquisition unit 11, a video acquisition unit 12, a display information output unit 13, a video analysis unit 15, an operation recognition unit 16, and a display information generation unit 17. The video acquisition unit 12 and the display information output unit 13 constitute an input/output unit 14.

The user information acquisition unit 11 (user information acquisition means) acquires user information regarding the user wearing the virtual reality display device 100. The user information acquisition unit 11 outputs the acquired user information to the display information generation unit 17. The user information includes information such as personal information, an attribute, a skill, and an affiliation of the user. For example, the user information is stored in a storage unit (not illustrated). For example, the user information acquisition unit 11 acquires, from the storage unit, the user information set in advance according to the user who uses the virtual reality display device 100. For example, the user information acquisition unit 11 selects one of a plurality of pieces of user information stored in the storage unit. For example, the user information acquisition unit 11 acquires the user information regarding the user who uses the virtual input device 10 from an authentication device (not illustrated) connected to the virtual input device 10.

The video acquisition unit 12 (video acquisition means) acquires image data from the virtual reality display device 100. The image data is image data captured by the camera 120 (the camera 120L and the camera 120R) of the virtual reality display device 100. The video acquisition unit 12 outputs the acquired image data to the video analysis unit 15. The video acquisition unit 12 may be configured to acquire video data including a plurality of pieces of temporally continuous image data (frames). In such a configuration, the video acquisition unit 12 outputs the acquired video data to the video analysis unit 15.

The display information output unit 13 (display information acquisition means) outputs display information generated by the display information generation unit 17 to the virtual reality display device 100. The display information includes an image to be displayed on the display unit 130 of the virtual reality display device 100 and coordinates at which the image is to be displayed.

The video acquisition unit 12 and the display information output unit 13 constitute the input/output unit 14 (input/output means). For example, the input/output unit 14 is connected to the virtual reality display device 100 by wireless communication such as Bluetooth (registered trademark), Wi-Fi (registered trademark), or wireless LAN. The input/output unit 14 may be connected to the virtual reality display device 100 by a wireless method other than Bluetooth (registered trademark), Wi-Fi (registered trademark), or wireless LAN. Furthermore, the input/output unit 14 may be connected to the virtual reality display device 100 via a wired cable as long as workability of the user is not affected.

The video analysis unit 15 (video analysis means) acquires the video data from the video acquisition unit 12. The video analysis unit 15 analyzes the acquired video data and detects the operation terminal 170. The video analysis unit 15 detects the position of at least one mark attached to the operation terminal 170. The video analysis unit 15 may set the mark on the operation terminal 170 according to a feature detected from the operation terminal 170. The video analysis unit 15 outputs the detected position of the at least one mark to the display information generation unit 17.

In addition, the video analysis unit 15 detects the position of the hand or finger of the user who operates the operation terminal 170. The video analysis unit 15 outputs the position of the hand or finger of the user and the position of the at least one mark attached to the operation terminal 170 to the operation recognition unit 16. For example, the mark is physically attached to the surface of the operation terminal 170. The mark may be specified based on an appearance or feature of the operation terminal 170.

The operation recognition unit 16 (operation recognition means) acquires the position of the hand or finger of the user and the position of the mark attached to the operation terminal 170 from the video analysis unit 15. The operation recognition unit 16 specifies the position of a key of the operation terminal 170 based on the position of the mark attached to the operation terminal 170. For example, in a case where the relative position of the key of the operation terminal 170 based on the position of the mark attached to the operation terminal 170 is stored in the storage unit (not illustrated), the position of the key of the operation terminal 170 can be specified based on the position of the mark. In addition, the operation recognition unit 16 associates the position of the hand or finger of the user with the position of the key of the operation terminal 170, and specifies the key on which the user has performed an input operation. The operation recognition unit 16 outputs information regarding the specified key to the display information generation unit 17.

The display information generation unit 17 (display information generation means) acquires the user information from the user information acquisition unit 11. In addition, the display information generation unit 17 acquires the position of the at least one mark attached to the operation terminal 170 from the video analysis unit 15. The display information generation unit 17 generates an image of the virtual terminal VT based on the user information according to the acquired position of the at least one mark.

Further, the display information generation unit 17 acquires the information regarding the specified key from the operation recognition unit 16. The display information generation unit 17 generates an image of the virtual monitor VM to be displayed on the display unit 130 of the virtual reality display device 100 according to the specified key. The display information generation unit 17 outputs the generated image (display information) to the display information output unit 13.

(Operation)

Next, an example of an operation of the virtual input system 1 according to the present example embodiment will be described with reference to the drawings.

Hereinafter, an example of an operation of the virtual input device 10 included in the virtual input system 1 will be described.

Figure 8:
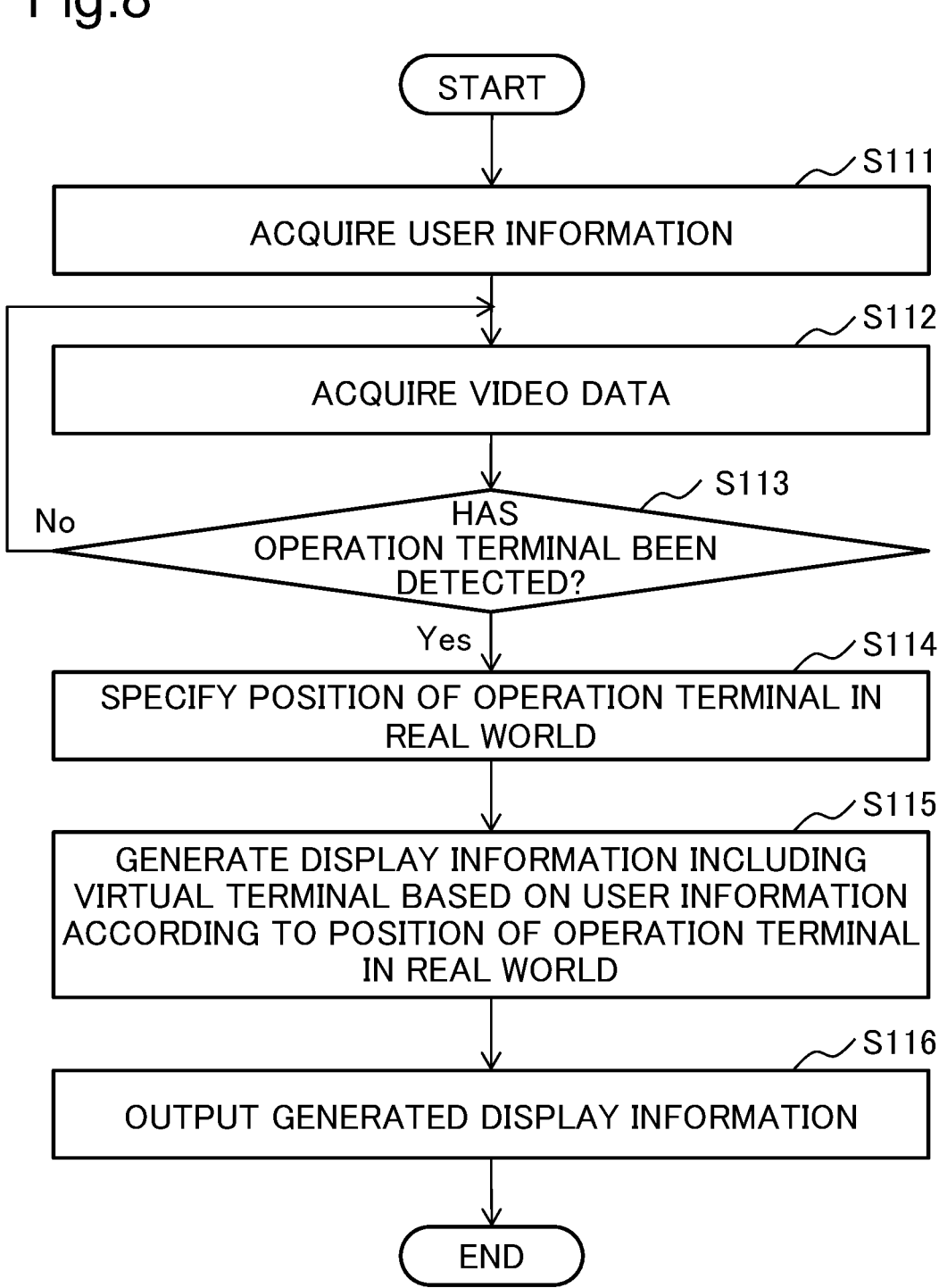
FIG. 8 is a flowchart for describing an example of an operation of the virtual input device included in the virtual input system according to the present disclosure.

FIG. 8 is a flowchart for describing an example of the operation of the virtual input device 10. The flowchart of FIG. 8 relates to a step of displaying the virtual terminal VT based on the user information. The virtual input device 10 is an operation subject in processing in the flowchart of FIG. 8.

In FIG. 8, first, the virtual input device 10 acquires user information of a user who uses the virtual reality display device 100 (step S111).

Next, the virtual input device 10 acquires video data (image data) captured by the camera 120 of the virtual reality display device 100 (step S112).

Next, the virtual input device 10 analyzes the acquired video data (image data) and detects the operation terminal 170 (step S113).

In a case where the operation terminal 170 has been detected from the video data (image data) (Yes in step S113), the virtual input device 10 specifies the position of the operation terminal 170 in the real world (step S114). In a case where the operation terminal 170 has not been detected (No in step S113), the virtual input device 10 acquires new video data (image data) (step S112).

After step S114, the virtual input device 10 generates display information including the virtual terminal VT based on the user information according to the position of the operation terminal 170 in the real world (step S115).

Next, the virtual input device 10 outputs the generated display information to the virtual reality display device 100 (step S116). A video (image) based on the display information output from the virtual input device 10 is displayed on the display unit 130 of the virtual reality display device 100. After step S116, the processing proceeds to processing in the flowchart of FIG. 9.

Figure 9:
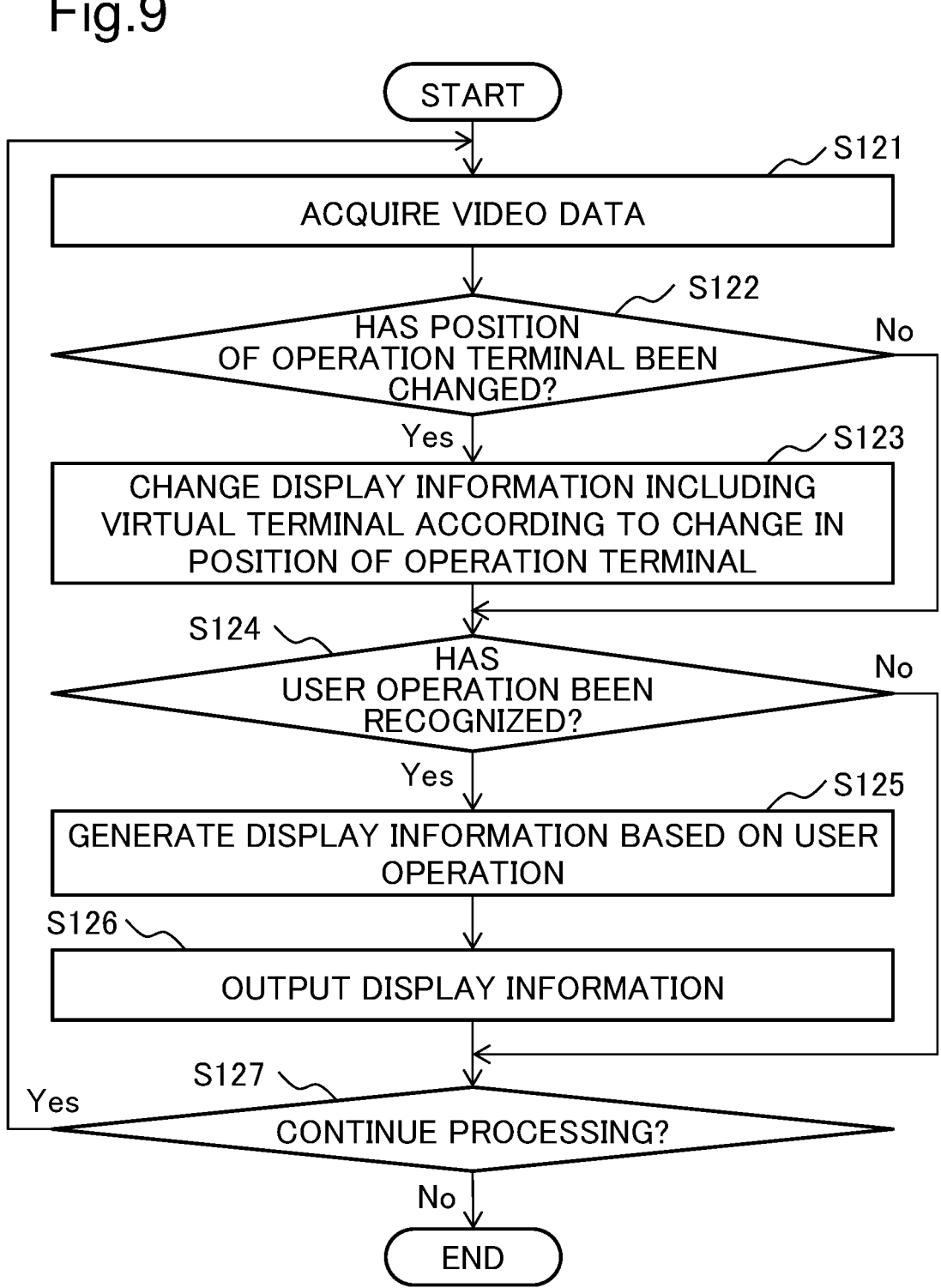
FIG. 9 is a flowchart for describing an example of the operation of the virtual input device included in the virtual input system according to the present disclosure.

FIG. 9 is a flowchart for describing an example of the operation of the virtual input device 10. The flowchart of FIG. 9 relates to a step of changing display according to a user operation for the virtual terminal VT displayed according to the user information. The virtual input device 10 is an operation subject in processing in the flowchart of FIG. 9.

In FIG. 9, first, the virtual input device 10 acquires video data (image data) captured by the camera 120 of the virtual reality display device 100 (step S121).

Next, the virtual input device 10 analyzes the acquired video data (image data) and detects a change in position of the operation terminal 170 (step S122).

In a case where a change in position of the operation terminal 170 has been detected from the video data (image data) (Yes in step S122), the virtual input device 10 changes the display information including the virtual terminal VT according to the change in position of the operation terminal 170 in the real world (step S123). In a case where a change in position of the operation terminal 170 has not been detected (No in step S122), the processing proceeds to step S124.

After step S123 or in a case where negative determination (No) is made in step S122, the virtual input device 10 recognizes a user operation for the operation terminal 170 based on the video data (image data) (step S124).

In a case where the user operation for the operation terminal 170 has been recognized (Yes in step S124), the virtual input device 10 generates display information based on the user operation (step S125). In a case where the user operation for the operation terminal 170 has not been recognized (No in step S124), the processing proceeds to step S127.

After step S125, the virtual input device 10 generates the display information based on the user operation (step S125).

Next, the virtual input device 10 outputs the generated display information to the virtual reality display device 100 (step S126). A video (image) based on the display information output from the virtual input device 10 is displayed on the display 130 of the virtual reality display device 100.

After step S126 or in a case where negative determination (No) is made in step S124, the processing returns to step S121. In a case of ending the series of processing (No in step S127), the processing in the flowchart of FIG. 9 ends.

As described above, the virtual input system of the present example embodiment includes the virtual reality display device, the virtual input device, and the operation terminal. The virtual reality display device includes the camera and the display. The virtual reality display device outputs image data captured by the camera to the virtual input device. The virtual reality display device acquires display information output from the virtual input device. The virtual reality display device displays an image based on the acquired display information on the display. The virtual input device includes the user information acquisition unit, the video acquisition unit, the video analysis unit, the operation recognition unit, the display information generation unit, and the display information output unit. The video acquisition unit and the display information output unit constitute the input/output unit. The user information acquisition unit acquires user information of a user who uses the virtual reality display device. The video acquisition unit acquires the image data captured by the camera of the virtual reality display device. The video analysis unit analyzes the image data and specifies a position at which the virtual terminal is to be displayed. The display information generation unit generates the display information including the virtual terminal based on the user information of the user wearing the virtual reality display device. The display information output unit outputs the display information to be displayed on the display of the virtual reality display device to the virtual reality display device. The operation terminal is disposed in the real world. The operation terminal is operated by the user wearing the virtual input device.

The virtual input device included in the virtual input system of the present example embodiment specifies the position at which the virtual terminal is to be displayed based on real-world image data captured by the camera of the virtual reality display device. The virtual input device of the present example embodiment outputs display information in which the virtual terminal is displayed at the specified position to the virtual reality display device. The virtual terminal based on the user information of the user is displayed at the position reflecting the situation in the real world on the display of the virtual reality display device worn by the user. The user wearing the virtual reality display device visually recognizes the virtual terminal displayed at the position reflecting the situation in the real world. The user can operate the virtual terminal customized for the user without feeling uncomfortable as if the operation terminal is disposed in the real world. Therefore, with the virtual input system of the present example embodiment, it is possible to implement a continuous operation for the virtual terminal displayed in the virtual space.

For example, the virtual input system of the present example embodiment can be applied as an alternative to a dedicated terminal used in a fire command center. The dedicated terminal used in a fire command center has a different key with a high use frequency for each organization. Therefore, even in the same dedicated terminal, the dedicated terminal is customized for each organization in order to make a key having a high use frequency stand out. In a case where the virtual input system of the present example embodiment is used, the virtual terminal can be customized for each organization by changing the display on the display.

The virtual input system of the present example embodiment can also be applied to applications other than a fire command center. For example, the virtual input system of the present example embodiment can be applied to a communication command center of a police station. For example, the virtual input system of the present example embodiment can be applied to a call center that performs communication through a call. For example, the virtual input system of the present example embodiment can be applied to a point of sale (POS) system. The virtual input system of the present example embodiment can be applied to any system as long as the system uses a virtual reality display device such as an HMD.

The virtual input system of the present example embodiment can also be applied to use scenes such as augmented reality (AR) and mixed reality (MR). In use scenes such as augmented reality (AR) and mixed reality (MR), a transparent virtual reality display device is used. In a case where the transparent virtual reality display device is used, an interactive operation with the real world is implemented while viewing the real world through the display. In this case, it is sufficient if the virtual terminal is superimposed on a key of the real-world operation terminal to highlight the key without displaying the virtual terminal.

Furthermore, the virtual input system of the present example embodiment may be applied to a use scene of substitutional reality (SR). In the use scene of substitutional reality (SR), the virtual input system of the present example embodiment implements an interactive operation with the past real world or an imaginary virtual world instead of the real world in real time. For example, the interactive operation with the past real world is suitable for training for coping with a fire or an accident that has actually occurred. For example, the interactive operation with the imaginary virtual world is suitable for games and the like.

In an aspect of the present example embodiment, the display information generation unit generates display information in which a key to be operated by the user among a plurality of keys included in the virtual terminal is highlighted according to the user information. Therefore, according to this aspect, the user wearing the virtual reality display device can intuitively grasp the key to be operated without overlooking the key by visually recognizing the highlighted key.

In an aspect of the present example embodiment, the video analysis unit detects the operation terminal disposed in the real world from the image data. The video analysis unit specifies the position of the operation terminal on the display of the virtual reality display device. The display information generation unit generates display information in which the virtual terminal is displayed at the specified position of the operation terminal. In this aspect, the virtual terminal is superimposed on the operation terminal disposed in the real world and displayed on the display of the virtual reality display device. According to this aspect, it is possible to operate the operation terminal disposed in the real world while visually recognizing the virtual terminal displayed on the display of the virtual reality display device. According to this aspect, since the virtual terminal can be operated with a tactile sensation of the operation terminal disposed in the real world, the virtual terminal can be continuously operated with a natural operation feeling.

The virtual input device according to an aspect of the present example embodiment includes the operation recognition unit that analyzes image data and recognizes a user operation. The display information generation unit generates display information based on the recognized user operation. According to this aspect, it is possible to implement an input operation of the user who works while visually recognizing the virtual terminal superimposed on the operation terminal, by recognizing the user operation for the operation terminal disposed in the real world. The user can operate the virtual terminal superimposed on the operation terminal without discomfort while touching the operation terminal disposed in the real world.

Second Example Embodiment

Next, a virtual input device according to a second example embodiment will be described with reference to the drawings. In the virtual input device of the present example embodiment, display of a virtual terminal is set according to a content of a list registered in advance. The virtual input device of the present example embodiment is incorporated in the virtual input system of the first example embodiment instead of the virtual input device according to the first example embodiment.

(Configuration)

Figure 10:
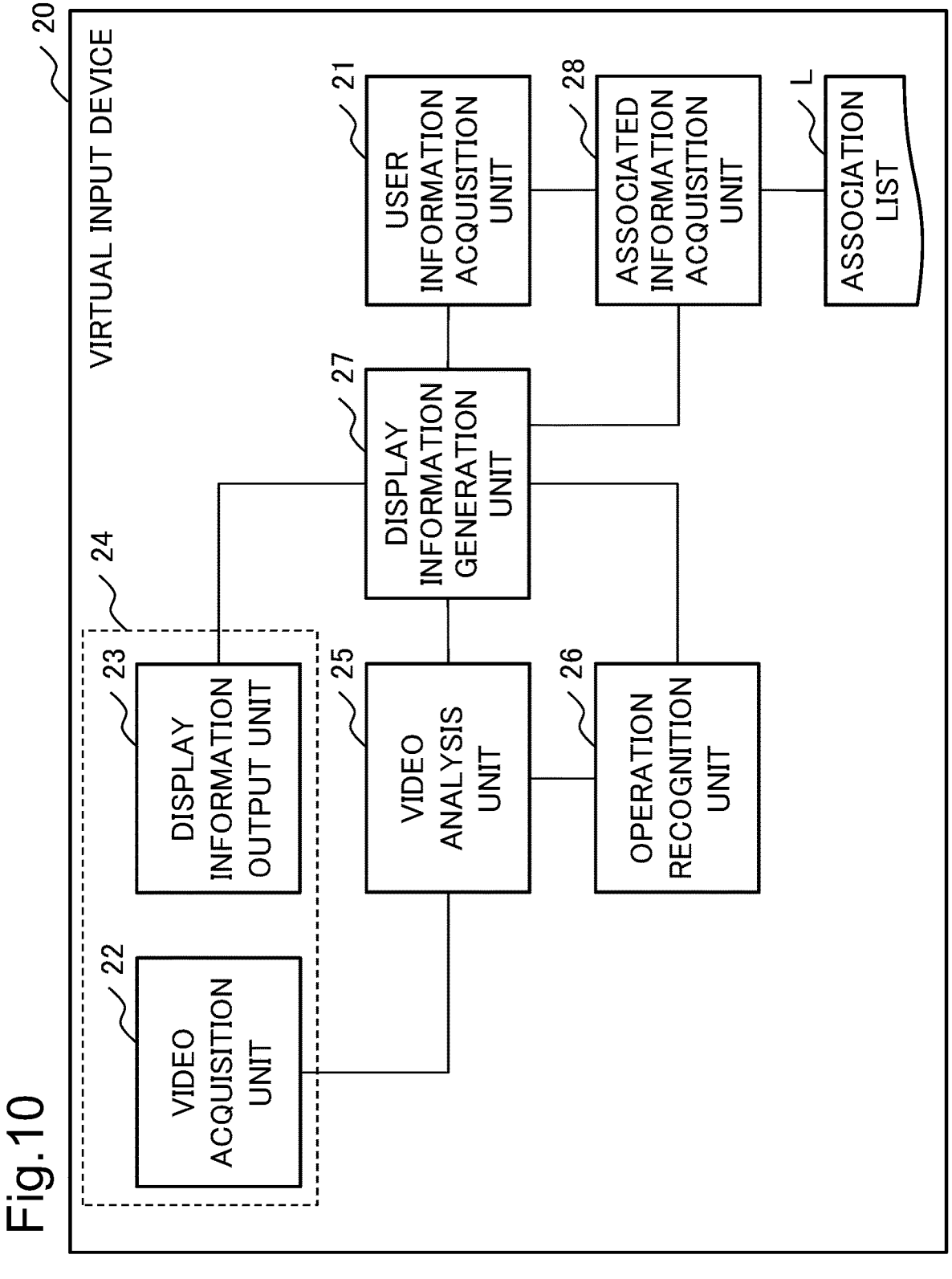
FIG. 10 is a block diagram illustrating an example of a configuration of a virtual input device according to the present disclosure.

FIG. 10 is a block diagram illustrating an example of a configuration of a virtual input device 20. The virtual input device 20 includes a user information acquisition unit 21, a video acquisition unit 22, a display information output unit 23, a video analysis unit 25, an operation recognition unit 26, a display information generation unit 27, and an associated information acquisition unit 28. The video acquisition unit 22 and the display information output unit 23 constitute an input/output unit 24. The virtual input device 20 stores an association list L based on user information.

The user information acquisition unit 21 (user information acquisition means) has the same configuration as the user information acquisition unit 11 of the first example embodiment. The user information acquisition unit 21 acquires the user information regarding a user wearing a virtual reality display device.

The video acquisition unit 22 (video acquisition means) has the same configuration as the video acquisition unit 12 of the first example embodiment. The video acquisition unit 22 acquires image data from the virtual reality display device. The image data is image data captured by a camera of the virtual reality display device. The video acquisition unit 22 outputs the acquired image data to the video analysis unit 25. The video acquisition unit 22 may be configured to acquire video data including a plurality of pieces of temporally continuous image data (frames). In such a configuration, the video acquisition unit 22 outputs the acquired video data to the video analysis unit 25.

The display information output unit 23 (display information output means) has the same configuration as the display information output unit 13 of the first example embodiment. The display information output unit 23 outputs display information generated by the display information generation unit 27 to the virtual reality display device. The display information includes an image to be displayed on a display of the virtual reality display device and coordinates at which the image is to be displayed.

Similarly to the first example embodiment, the video acquisition unit 22 and the display information output unit 23 constitute the input/output unit 24 (input/output means). For example, the input/output unit 24 is connected to the virtual reality display device by wireless communication such as Bluetooth (registered trademark), Wi-Fi (registered trademark), or wireless LAN. The input/output unit 24 may be connected to the virtual reality display device by a wireless method other than Bluetooth (registered trademark), Wi-Fi (registered trademark), or wireless LAN. Furthermore, the input/output unit 24 may be connected to the virtual reality display device via a wired cable as long as workability of the user is not affected.

The video analysis unit 25 (video analysis means) has the same configuration as the video analysis unit 15 of the first example embodiment. The video analysis unit 25 acquires the video data from the video acquisition unit 22. The video analysis unit 25 analyzes the acquired video data and detects an operation terminal. The video analysis unit 25 detects the position of at least one mark attached to the operation terminal. The video analysis unit 25 outputs the detected position of the at least one mark to the display information generation unit 27.

In addition, the video analysis unit 25 detects the position of the hand or finger of the user who operates the operation terminal. The video analysis unit 25 may set the mark on the operation terminal according to a feature detected from the operation terminal. The video analysis unit 25 outputs the position of the hand or finger of the user and the position of the at least one mark attached to the operation terminal to the operation recognition unit 26.

The operation recognition unit 26 (operation recognition means) acquires the position of the hand or finger of the user and the position of the mark attached to the operation terminal from the video analysis unit 25. The operation recognition unit 26 specifies the position of a key of the operation terminal based on the position of the mark attached to the operation terminal. In addition, the operation recognition unit 26 associates the position of the hand or finger of the user with the position of the key of the operation terminal, and specifies the key on which the user has performed an input operation. The operation recognition unit 26 outputs information regarding the specified key to the display information generation unit 27.

The associated information acquisition unit 28 (associated information acquisition means) acquires the user information of the user who uses the virtual reality display device from the user information acquisition unit 21. The associated information acquisition unit 28 acquires the associated information based on the user information from the association list L stored in a storage unit (not illustrated). The association list L is a list in which the associated information associated to an intention of the system is collected. For example, the association list L includes the associated information regarding a job of the user. The association list L includes the associated information regarding a scenario scene of the job of the user. In the present example embodiment, the associated information is information regarding a key to be operated by the user according to the scenario scene. The associated information acquisition unit 28 outputs the acquired associated information to the display information generation unit 27.

The associated information acquisition unit 28 may be configured to acquire the associated information from the outside. For example, the associated information is information regarding a scenario acquired according to the job of the user. For example, in a case where the user is an employee of a fire command center, the associated information is information regarding a scenario such as a firefighting scenario or an emergency scenario.

The display information generation unit 27 (display information generation means) acquires the user information from the user information acquisition unit 21. In addition, the display information generation unit 27 acquires the position of at least one mark attached to the operation terminal from the video analysis unit 25. Further, the display information generation unit 27 acquires the associated information from the associated information acquisition unit 28. The display information generation unit 27 generates an image of a virtual terminal VT based on the user information and the associated information according to the acquired position of the at least one mark.

Further, the display information generation unit 27 acquires the information regarding the specified key from the operation recognition unit 26. The display information generation unit 27 generates an image of a virtual monitor VM to be displayed on the display of the virtual reality display device according to the specified key. The display information generation unit 27 outputs the generated image (display information) to the display information output unit 23.

Figure 11:
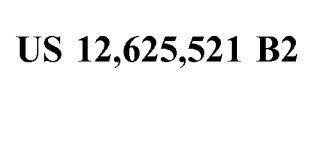
FIG. 11 is a conceptual view illustrating a display example of display information generated by the virtual input device according to the present disclosure.

FIG. 11 illustrates an example in which the virtual terminal VT whose display state has been changed according to the associated information included in the association list L is displayed on a display unit 230 (a display) of the virtual reality display device. In the example of FIG. 11, a virtual monitor VM1 and a virtual monitor VM2 (virtual monitor VM) are displayed on the display unit 230. Furthermore, in the example of FIG. 11, the virtual terminal VT is displayed on the display unit 230 in association with the position of the operation terminal disposed in the real world beyond the display unit 230. In a region R1 of the virtual terminal VT, a key whose display state has been changed according to a scenario is displayed. The display state of the key in the region R1 is displayed in a more conspicuous color or brightness as compared with display states of keys disposed in other regions. In a region R2 of the virtual terminal VT, character information related to the key is displayed in association with the key. The user wearing the virtual reality display device can focus on the key related to the job of the user or the like by visually recognizing the key whose display state has been changed.

For example, the virtual reality display device may be configured to emit sound or generate vibration when the display of the virtual terminal VT has been changed according to the associated information. With such a configuration, the user wearing the virtual reality display device can recognize that the display of the virtual terminal VT has been changed by the sound or vibration emitted or generated by the virtual reality display device. In a case where speakers are disposed on the left and right of the virtual reality display device, it is possible to notify which key of the virtual terminal VT has been changed by changing the volumes of the left and right speakers according to a position where the display of the virtual terminal VT has been changed. The virtual reality display device may be configured to emit sound or generate vibration at a timing when the user needs to be focused on the virtual terminal VT even in a case where the display of the virtual terminal VT is not changed. With such a configuration, the user can be focused on the virtual terminal VT at an appropriate timing.

[Association List]

Next, an example of the association list L stored in the virtual input device 20 will be described with reference to the drawings. The following association list L is an example, and does not limit the association list L stored in the virtual input device 20.

FIG. 12 is an example (association list L1) of the association list L stored in the virtual input device 20. The association list L1 stores information regarding a key whose display state is to be changed according to a scenario. In the example of the association list L1, keys (K1, K2, and K3) are associated with a scenario S1.

For example, the associated information acquisition unit 28 selects the scenario S1 registered in the association list L1 according to the user information. The associated information acquisition unit 28 outputs information regarding the keys (K1, K2, and K3) whose display states are to be changed to the display information generation unit 27 according to the acquired scenario S1. The display information generation unit 27 acquires, from the associated information acquisition unit 28, the information regarding the keys (K1, K2, and K3) whose display states are to be changed. The display information generation unit 27 changes the display states of the keys (K1, K2, and K3) according to the information acquired from the associated information acquisition unit 28.

Figure 13:
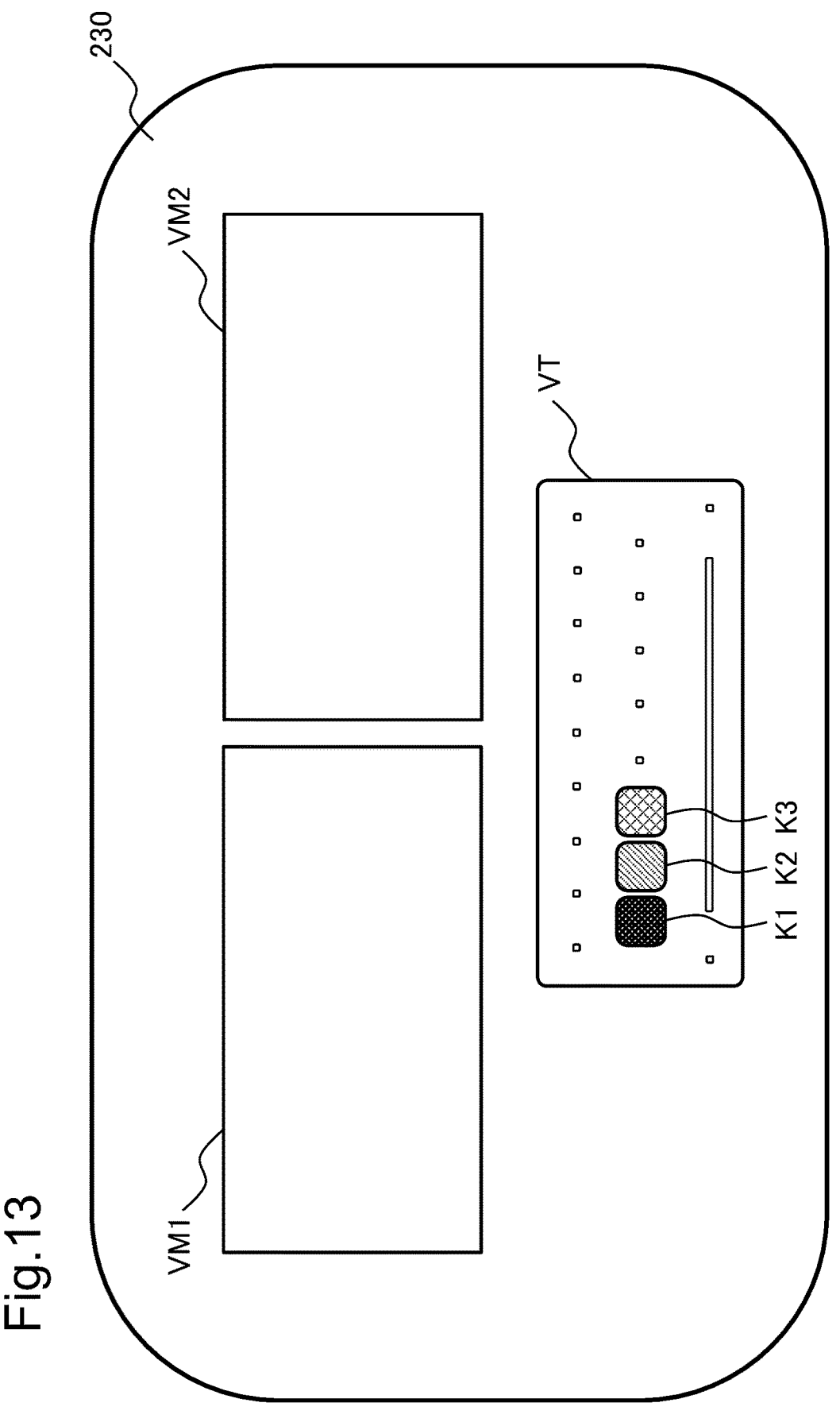
FIG. 13 is a conceptual view illustrating a display example of the display information generated by the virtual input device according to the present disclosure.

FIG. 13 illustrates an example in which the virtual terminal VT whose display state has been changed according to the association list L1 is displayed on the display unit 230 of the virtual reality display device. The virtual terminal VT is displayed on the display unit 230 in association with the position of the operation terminal disposed in the real world beyond the display unit 230. The key K1, the key K2, and the key K3 are displayed in a more conspicuous color or brightness as compared with the display states of the other keys. The user wearing the virtual reality display device can focus on the key related to the job of the user or the like by visually recognizing the key whose display state has been changed.

For example, in a scenario scene in which "Yes" or "No" is selected, a key for selecting "Yes" or "No" is highlighted. The user wearing the virtual reality display device can respond to the scenario scene by selecting one of the highlighted keys for selecting "Yes" and "No".

For example, in a scenario scene in which a vehicle is arranged due to occurrence of an accident, a fire, or the like, a key for arranging a vehicle is highlighted. In such a scenario scene, for example, a key for selecting "ambulance" or "fire engine" is highlighted. The user wearing the virtual reality display device can arrange a vehicle associated to the scenario scene by selecting at least one of the highlighted keys for selecting "ambulance" and "fire engine". In addition, in a case of a scenario scene of an accident or a fire, a map of the vicinity of a site where the fire or the accident has occurred, a situation of a fire department in the vicinity of the site, a video of the site, and the like may be displayed on the virtual monitor VM.

For example, in a case of a scenario scene of an emergency, a key for arranging an ambulance is highlighted. The user wearing the virtual reality display device can arrange an ambulance by selecting the highlighted key for selecting "ambulance". In addition, in a case of a scenario scene of an emergency, a key for selecting and inputting an address of a destination for which an ambulance is to be arranged and accompanying information such as an attribute or state of a transport target person may be highlighted.

FIG. 14 is an example (association list L2) of the association list L stored in the virtual input device 20. In the association list L2, the degree of interest is stored for each key of the virtual terminal VT.

Figure 15:
FIG. 15 is a conceptual view illustrating a display example of the display information generated by the virtual input device according to the present disclosure.

FIG. 15 illustrates an example in which the virtual terminal VT whose display state has been changed according to the association list L2 is displayed on the display unit 230 of the virtual reality display device. The virtual terminal VT is displayed on the display unit 230 in association with the position of the operation terminal disposed in the real world beyond the display unit 230. In the virtual terminal VT, a key whose display state has been changed according to the degree of interest is displayed. In the example of FIG. 15, a key with a higher degree of interest is displayed larger. The user wearing the virtual reality display device can focus on a key suitable for his/her scenario or situation by visually recognizing the key whose display state has been changed according to the degree of interest.

FIG. 16 is an example (association list L3) of the association list L stored in the virtual input device 20. In the association list L3, keys that should not be pressed by mistake and should be ignored are stored. For example, in a scenario scene of firefighting, a key for a scenario scene (for example, an emergency scenario scene) which is not related to firefighting is stored in the association list L3 as a key to be ignored.

Figure 17:
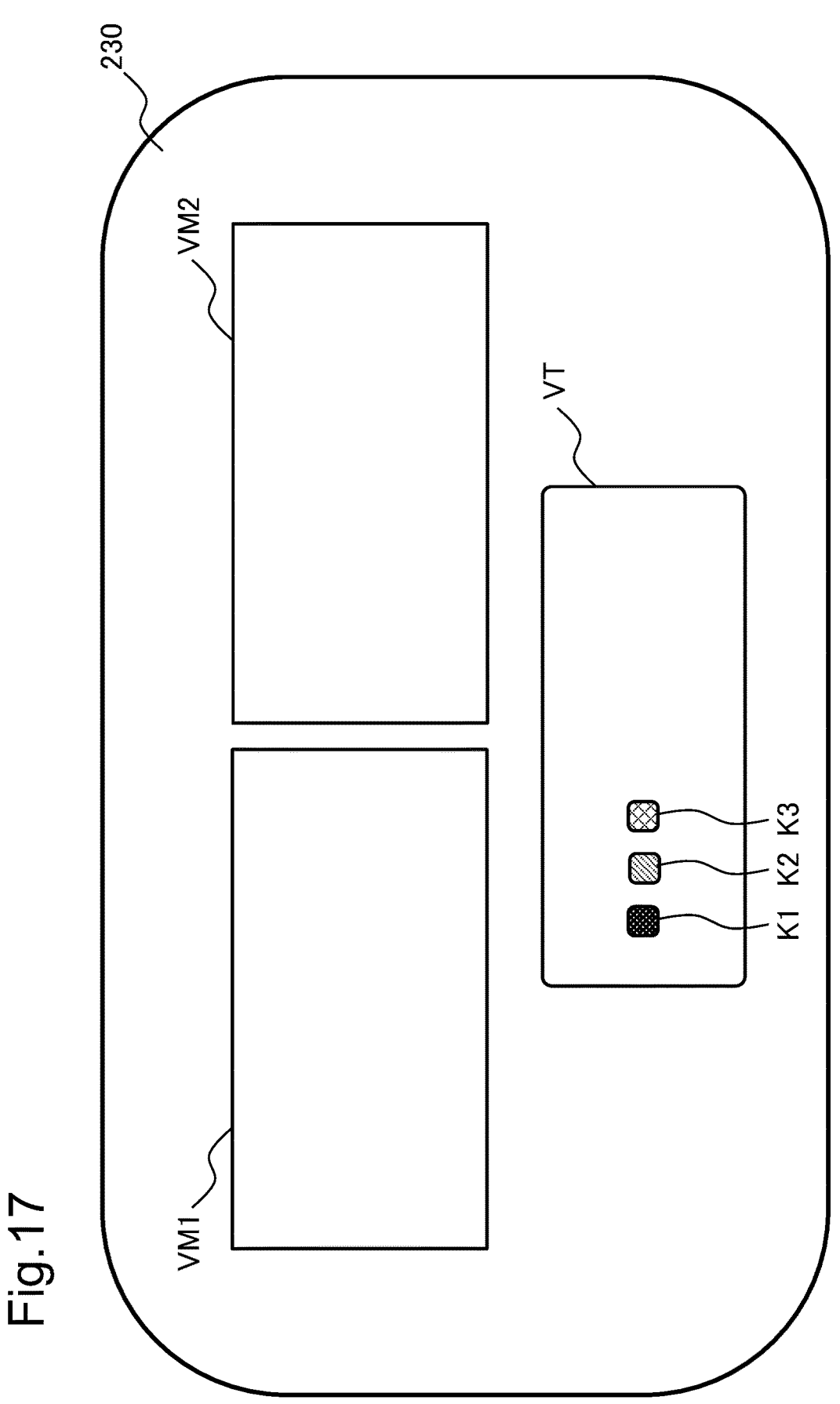
FIG. 17 is a conceptual view illustrating a display example of the display information generated by the virtual input device according to the present disclosure.

FIG. 17 illustrates an example in which the virtual terminal VT whose display state has been changed according to the association list L3 is displayed on the display unit 230 of the virtual reality display device. The virtual terminal VT is displayed on the display unit 230 in association with the position of the operation terminal disposed in the real world beyond the display unit 230. A key that may be ignored is not displayed in the virtual terminal VT, and only the key K1, the key K2, and the key 3 are displayed. The user wearing the virtual reality display device can focus on a key suitable for his/her scenario or situation by visually recognizing the key whose display state has been changed.

Figure 18:
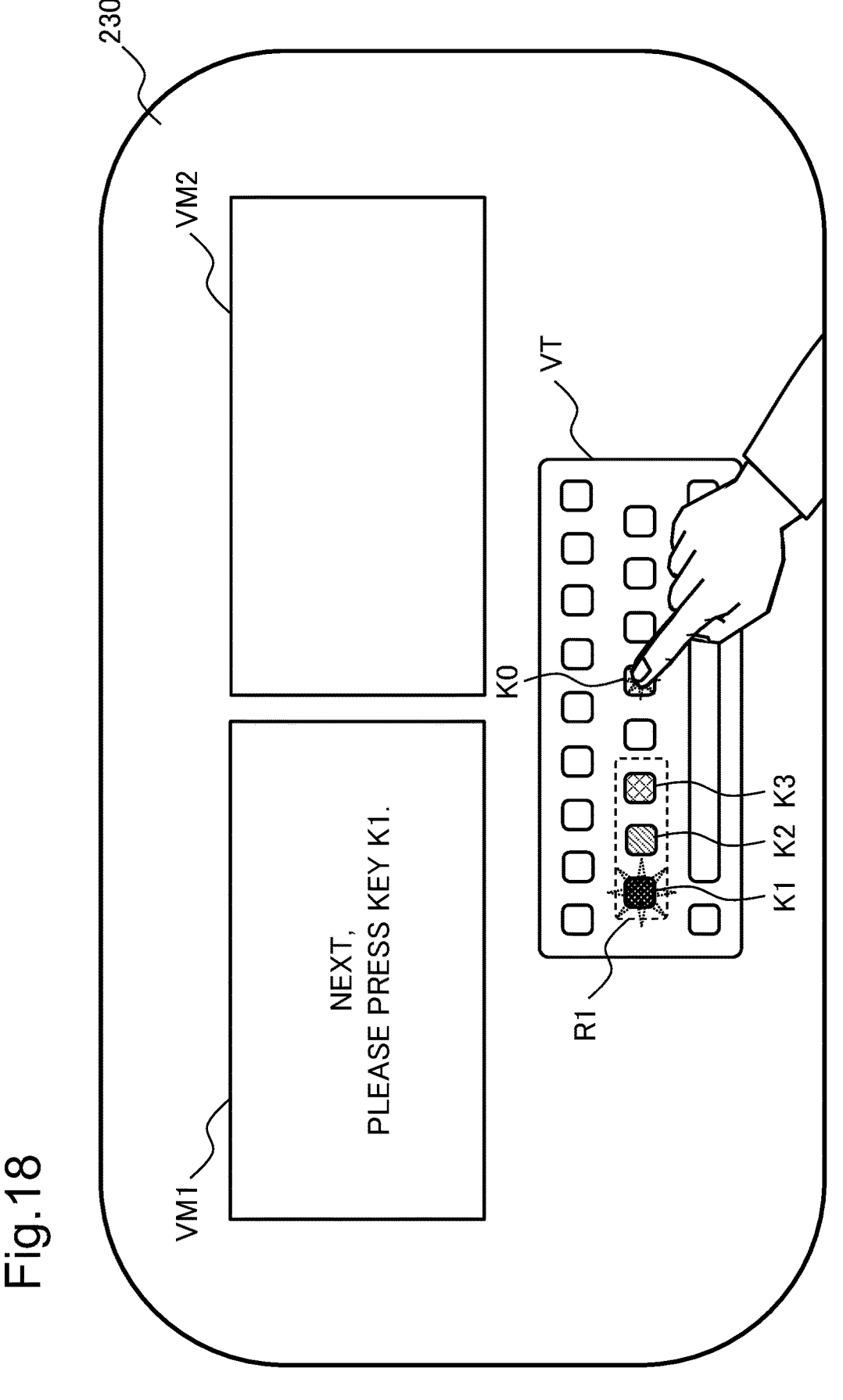
FIG. 18 is a conceptual view illustrating a display example of the display information generated by the virtual input device according to the present disclosure.

FIG. 18 illustrates an example in which a guidance related to the next operation is displayed on the display unit 230 of the virtual reality display device according to selection of a specific key. The virtual terminal VT is displayed on the display unit 230 in association with the position of the operation terminal disposed in the real world beyond the display unit 230. In the example of FIG. 18, a guidance "Next, please press key K1." is displayed on the virtual monitor VM1 in response to selection of a key K0 of the virtual terminal VT. In the region R1 of the virtual terminal VT displayed on the display unit 230, a key whose display state has been changed according to a scenario is displayed. The display state of the key in the region R1 is displayed in a more conspicuous color or brightness as compared with display states of keys disposed in other regions. In particular, the key K1 to be operated next is displayed in a highlighted manner unlike other keys. For example, the display of the virtual monitor VM1 or the virtual terminal VT is changed according to a scenario of the association list. The user wearing the virtual reality display device can select the key K1 to be operated next by visually recognizing the guidance displayed on the virtual monitor VM1 and the key K1 highlighted and displayed on the virtual terminal VT. The guidance regarding the next operation may be provided not only by the display of the virtual monitor VM but also by voice.

(Operation)

Next, an example of an operation of the virtual input device 20 according to the present example embodiment will be described with reference to the drawings.

Hereinafter, a step of displaying the virtual terminal VT according to the user information and the associated information will be described. A step of changing the display according to a user operation for the virtual terminal VT displayed according to the user information is similar to that of the first example embodiment (FIG. 9), and thus a description thereof will be omitted.

Figure 19:
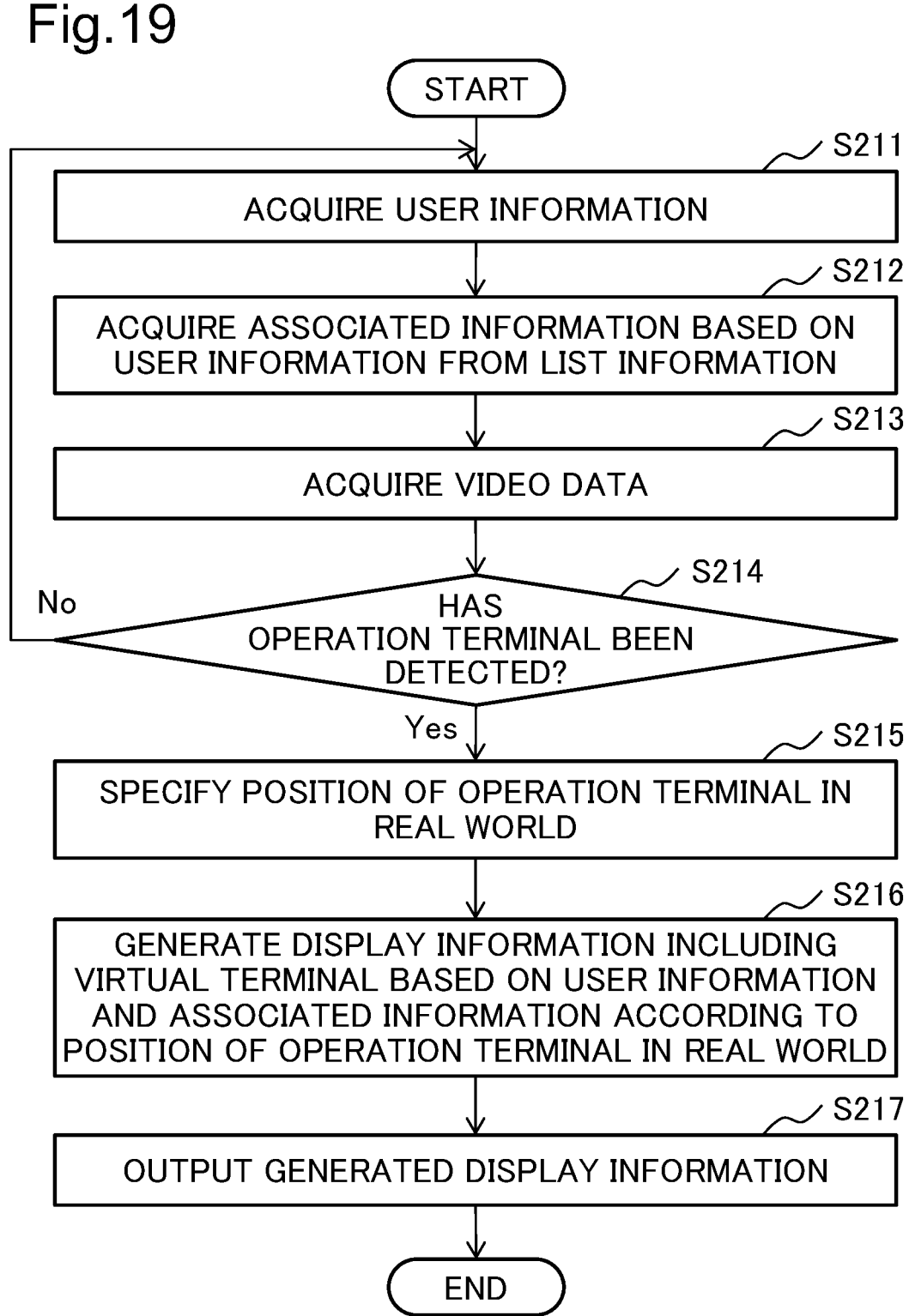
FIG. 19 is a flowchart for describing an example of an operation of the virtual input device according to the present disclosure.

FIG. 19 is a flowchart for describing an example of the operation of the virtual input device 20. The virtual input device 20 is an operation subject in processing in the flowchart of FIG. 19.

In FIG. 19, first, the virtual input device 20 acquires user information of a user who uses the virtual reality display device (step S211).

Next, the virtual input device 20 acquires associated information based on the user information from the association list L stored in the storage unit (not illustrated) (step S212).

Next, the virtual input device 20 acquires video data (image data) captured by the camera of the virtual reality display device (step S213).

Next, the virtual input device 20 analyzes the acquired video data (image data) and detects the operation terminal (step S214).

In a case where the operation terminal has been detected from the video data (image data) (Yes in step S214), the virtual input device 20 specifies the position of the operation terminal in the real world (step S215). In a case where the operation terminal has not been detected (No in step S214), the virtual input device 20 acquires new video data (image data) (step S213).

After step S215, the virtual input device 20 generates display information including the virtual terminal VT based on the user information and the associated information according to the position of the operation terminal in the real world (step S216).

Next, the virtual input device 20 outputs the generated display information to the virtual reality display device (step S217). A video (image) based on the display information output from the virtual input device 20 is displayed on the display unit 230 of the virtual reality display device. After step S217, the processing proceeds according to the processing of the first example embodiment (the flowchart of FIG. 9).

As described above, the virtual input device of the present example embodiment includes the user information acquisition unit, the associated information acquisition unit, the video acquisition unit, the video analysis unit, the operation recognition unit, the display information generation unit, and the display information output unit. The video acquisition unit and the display information output unit constitute the input/output unit. The user information acquisition unit acquires user information of a user who uses the virtual reality display device. The associated information acquisition unit acquires the associated information based on the user information. The video acquisition unit acquires the image data captured by the camera of the virtual reality display device. The video analysis unit analyzes the image data and specifies a position at which the virtual terminal is to be displayed. The display information generation unit generates the display information including the virtual terminal based on the user information of the user wearing the virtual reality display device. The display information generation unit also highlights a key associated to the associated information. The display information output unit outputs the display information to be displayed on the display unit of the virtual reality display device to the virtual reality display device.

The virtual input device of the present example embodiment specifies the position at which the virtual terminal is to be displayed based on real-world image data captured by the camera of the virtual reality display device. The virtual input device of the present example embodiment outputs display information in which the virtual terminal is displayed at the specified position to the virtual reality display device. The virtual terminal based on the user information of the user is displayed at the position reflecting the situation in the real world on the display of the virtual reality display device worn by the user. In the virtual terminal, a key associated to the associated information is highlighted. The user wearing the virtual reality display device visually recognizes the virtual terminal in which the key associated to the associated information is highlighted. The user can recognize the key to be operated by visually recognizing the highlighted key. Therefore, with the virtual input device of the present example embodiment, an intuitive operation for the virtual terminal displayed in the virtual space can be implemented.

Third Example Embodiment

Next, a virtual input device according to a third example embodiment will be described with reference to the drawings. The virtual input device of the present example embodiment performs authentication of a user by using an authentication device. The virtual input device of the present example embodiment is incorporated in the virtual input system of the first example embodiment instead of the virtual input device according to the first example embodiment. The virtual input device of the present example embodiment may be combined with the virtual input device according to the second example embodiment.

(Configuration)

FIG. 20 is a block diagram illustrating an example of a configuration of a virtual input device 30. The virtual input device 30 includes a user information acquisition unit 31, a video acquisition unit 32, a display information output unit 33, a video analysis unit 35, an operation recognition unit 36, and a display information generation unit 37. The video acquisition unit 32 and the display information output unit 33 constitute an input/output unit 34. The virtual input device 30 is connected to an authentication device 310.

The authentication device 310 is a device that performs authentication of a user wearing a virtual reality display device. The authentication device 310 outputs authentication information of the authenticated user to the virtual input device 30. For example, the authentication device 310 outputs an identifier of the authenticated user to the virtual input device 30 as the authentication information of the user. The authentication device 310 does not output the authentication information of a user who has failed in authentication to the virtual input device 30.

For example, the authentication device 310 receives an input of an identifier (ID) and a password of the user to authenticate the user. For example, the authentication device 310 is a biometric authentication device that performs authentication of the user by using biometric information such as a fingerprint, a palm print, a finger vein, an iris, a face, or a voice of the user. As long as the user can be authenticated, the authentication method performed by the authentication device 310 is not limited. The authentication device 310 may be provided separately from the virtual reality display device connected to the virtual input device 30, or may be provided in the virtual reality display device. For example, the face or the iris of the user may be authenticated by a camera built in the virtual reality display device. For example, the user may be authenticated by ear authentication using a hearable device provided together with the virtual reality display device.

The user information acquisition unit 31 (user information acquisition means) acquires the authentication information of the user from the authentication device 310. The user information acquisition unit 31 performs authentication of the user according to the acquired authentication information of the user. In a case where the user has succeeded in authentication, the user information acquisition unit 31 acquires user information regarding the user. The user information acquisition unit 31 outputs the acquired user information to the display information generation unit 37. In addition, in a case where the user has failed in authentication, the user information acquisition unit 31 outputs non-authentication information indicating that the user has failed in authentication to the display information generation unit 37.

The video acquisition unit 32 (video acquisition means) has the same configuration as the video acquisition unit 12 of the first example embodiment. The video acquisition unit 32 acquires image data from the virtual reality display device. The image data is image data captured by a camera of the virtual reality display device. The video acquisition unit 32 outputs the acquired image data to the video analysis unit 35. The video acquisition unit 32 may be configured to acquire video data including a plurality of pieces of temporally continuous image data (frames). In such a configuration, the video acquisition unit 32 outputs the acquired video data to the video analysis unit 35.

The display information output unit 33 (display information output means) has the same configuration as the display information output unit 13 of the first example embodiment. The display information output unit 33 outputs display information generated by the display information generation unit 37 to the virtual reality display device. The display information includes an image to be displayed on a display of the virtual reality display device and coordinates at which the image is to be displayed.

Similarly to the first example embodiment, the video acquisition unit 32 and the display information output unit 33 constitute the input/output unit 34. For example, the input/output unit 34 is connected to the virtual reality display device by wireless communication such as Bluetooth (registered trademark), Wi-Fi (registered trademark), or wireless LAN. The input/output unit 34 may be connected to the virtual reality display device by a wireless method other than Bluetooth (registered trademark), Wi-Fi (registered trademark), or wireless LAN. Furthermore, the input/output unit 34 may be connected to the virtual reality display device via a wired cable as long as workability of the user is not affected.

The video analysis unit 35 (video analysis means) has the same configuration as the video analysis unit 15 of the first example embodiment. The video analysis unit 35 acquires the video data from the video acquisition unit 32. The video analysis unit 35 analyzes the acquired video data and detects an operation terminal. The video analysis unit 35 detects the position of at least one mark attached to the operation terminal. The video analysis unit 35 outputs the detected position of the at least one mark to the display information generation unit 37.

In addition, the video analysis unit 35 detects the position of the hand or finger of the user who operates the operation terminal. The video analysis unit 35 may set the mark on the operation terminal according to a feature detected from the operation terminal. The video analysis unit 35 outputs the position of the hand or finger of the user and the position of the at least one mark attached to the operation terminal to the operation recognition unit 36.

The operation recognition unit 36 (operation recognition means) acquires the position of the hand or finger of the user and the position of the mark attached to the operation terminal from the video analysis unit 35. The operation recognition unit 36 specifies the position of a key of the operation terminal based on the position of the mark attached to the operation terminal. In addition, the operation recognition unit 36 associates the position of the hand or finger of the user with the position of the key of the operation terminal, and specifies the key on which the user has performed an input operation. The operation recognition unit 36 outputs information regarding the specified key to the display information generation unit 37.

The display information generation unit 37 (display information generation means) acquires the user information from the user information acquisition unit 31. In addition, the display information generation unit 37 acquires the position of at least one mark attached to the operation terminal from the video analysis unit 35. The display information generation unit 37 generates an image of a virtual terminal VT based on the user information and the associated information according to the acquired position of the at least one mark.

Further, the display information generation unit 37 acquires the information regarding the specified key from the operation recognition unit 36. The display information generation unit 37 generates an image of a virtual monitor VM to be displayed on the display of the virtual reality display device according to the specified key. The display information generation unit 37 outputs the generated image (display information) to the display information output unit 33.

In addition, in a case where the non-authentication information is acquired from the user information acquisition unit 31, the display information generation unit 37 generates display information indicating that authentication has failed. The display information generation unit 37 outputs the generated display information to the display information output unit 33. The display information generation unit 37 may be configured not to generate the display information in a case where the non-authentication information is acquired.

(Operation)

Next, an example of an operation of the virtual input device 30 according to the present example embodiment will be described with reference to the drawings. Hereinafter, a step of displaying the virtual terminal VT based on the user information will be described. A step of changing the display according to a user operation for the virtual terminal VT displayed according to the user information is similar to that of the first example embodiment (FIG. 9), and thus a description thereof will be omitted.

FIG. 21 is a flowchart for describing an example of the operation of the virtual input device 30. The virtual input device 30 is an operation subject in processing in the flowchart of FIG. 21.

In FIG. 21, first, the virtual input device 30 acquires authentication information of the user wearing the virtual reality display device (step S311).

Next, the virtual input device 30 performs authentication of the user by using the acquired authentication information (step S312). In a case where the user has failed in authentication (No in step S312), the virtual input device 30 generates display information indicating that authentication has failed (step S313). After step S313, the processing proceeds to step S318.

In a case where the user has succeeded in authentication (Yes in step S312), the virtual input device 30 acquires video data (image data) captured by the camera of the virtual reality display device (step S314).

Next, the virtual input device 30 analyzes the acquired video data (image data) and detects the operation terminal (step S315).

In a case where the operation terminal has been detected from the video data (image data) (Yes in step S315), the virtual input device 30 specifies the position of the operation terminal in the real world (step S316). In a case where the operation terminal has not been detected (No in step S315), the virtual input device 30 acquires new video data (image data) (step S314).

After step S316, the virtual input device 30 generates display information including the virtual terminal based on the user information according to the position of the operation terminal in the real world (step S317).

After step S313 or step S317, the virtual input device 30 outputs the generated display information to the virtual reality display device (step S318). A video (image) based on the display information output from the virtual input device 30 is displayed on the display of the virtual reality display device. After step S318, the processing proceeds according to the processing of the first example embodiment (the flowchart of FIG. 9).

As described above, the virtual input device of the present example embodiment includes the user information acquisition unit, the video acquisition unit, the video analysis unit, the operation recognition unit, the display information generation unit, and the display information output unit. The video acquisition unit and the display information output unit constitute the input/output unit. The user information acquisition unit acquires user information of a user who uses the virtual reality display device. The user information acquisition unit acquires authentication information of the user who uses the virtual reality display device. The video acquisition unit acquires the image data captured by the camera of the virtual reality display device. The video analysis unit analyzes the image data and specifies a position at which the virtual terminal is to be displayed. The display information generation unit generates display information including the virtual terminal based on the user information of the user for the virtual reality display device used by the authenticated user. The display information output unit outputs the display information to be displayed on the display of the virtual reality display device to the virtual reality display device.

The virtual input device of the present example embodiment specifies the position at which the virtual terminal is to be displayed based on real-world image data captured by the camera of the virtual reality display device. The virtual input device of the present example embodiment outputs display information in which the virtual terminal is displayed at the specified position to the virtual reality display device used by the authenticated user. The virtual terminal based on the user information of the authenticated user is displayed at the position reflecting the situation in the real world on the display of the virtual reality display device worn by the user. Only an authenticated user can visually recognize the virtual terminal displayed on the display of the virtual reality display device. Therefore, with the virtual input system of the present example embodiment, the security of the operation for the virtual terminal displayed in the virtual space can be improved.

Fourth Example Embodiment

Next, an example of a configuration of a virtual input device according to a fourth example embodiment will be described with reference to the drawings. The virtual input device according to the present example embodiment has a configuration in which the virtual input devices of the first to third example embodiments are simplified.

Figure 22:
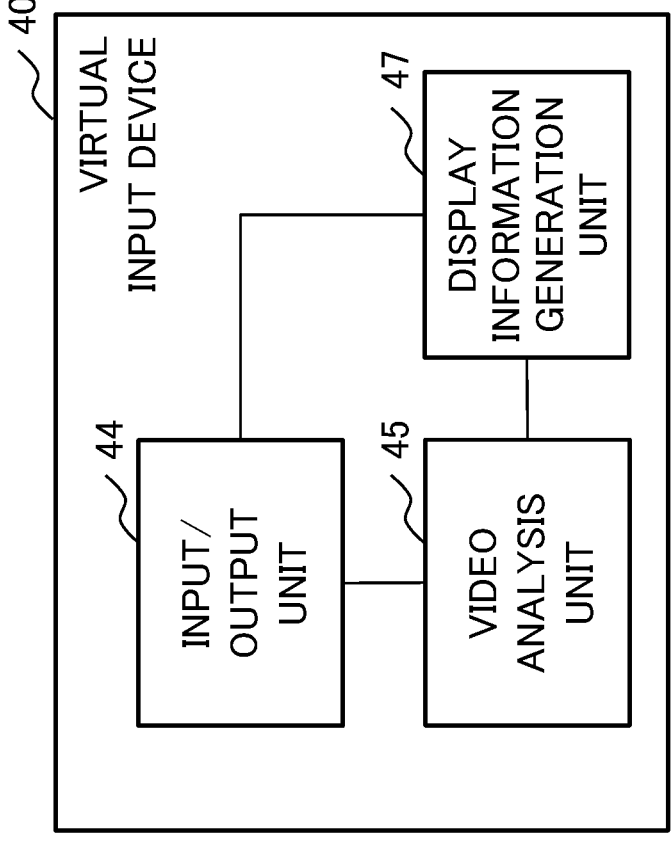
FIG. 22 is a block diagram illustrating an example of a configuration of a virtual input device according to the present disclosure.

FIG. 22 is a block diagram illustrating an example of a configuration of a virtual input device 40 according to the present example embodiment. The virtual input device 40 of the present example embodiment includes an input/output unit 44, a video analysis unit 45, and a display information generation unit 47. The input/output unit 44 (input/output means) acquires image data captured by a camera of a virtual reality display device. The input/output unit 44 outputs display information to be displayed on a display of the virtual reality display device to the virtual reality display device. The video analysis unit 45 (video analysis means) analyzes the image data and specifies a position where the virtual terminal is to be displayed. The display information generation unit 47 (display information generation means) generates the display information including the virtual terminal based on the user information of the user wearing the virtual reality display device.

The virtual input device of the present example embodiment specifies the position at which the virtual terminal is to be displayed based on real-world image data captured by the camera of the virtual reality display device. The virtual input device of the present example embodiment outputs display information in which the virtual terminal is displayed at the specified position to the virtual reality display device. The virtual terminal based on the user information of the user is displayed at the position reflecting the situation in the real world on the display of the virtual reality display device worn by the user. The user wearing the virtual reality display device visually recognizes the virtual terminal displayed at the position reflecting the situation in the real world. The user can operate the virtual terminal customized for the user without feeling uncomfortable as if the operation terminal is disposed in the real world. Therefore, with the virtual input device of the present example embodiment, a continuous operation for the virtual terminal displayed in the virtual space can be implemented.

(Hardware)

Next, a hardware configuration for executing control and processing according to each example embodiment of the present disclosure will be described with reference to the drawings. Here, an example of such a hardware configuration is an information processing device 90 (computer) in FIG. 23. The information processing device 90 in FIG. 23 is a configuration example for executing the control and processing according to each example embodiment, and does not limit the scope of the present disclosure.

Figure 23:
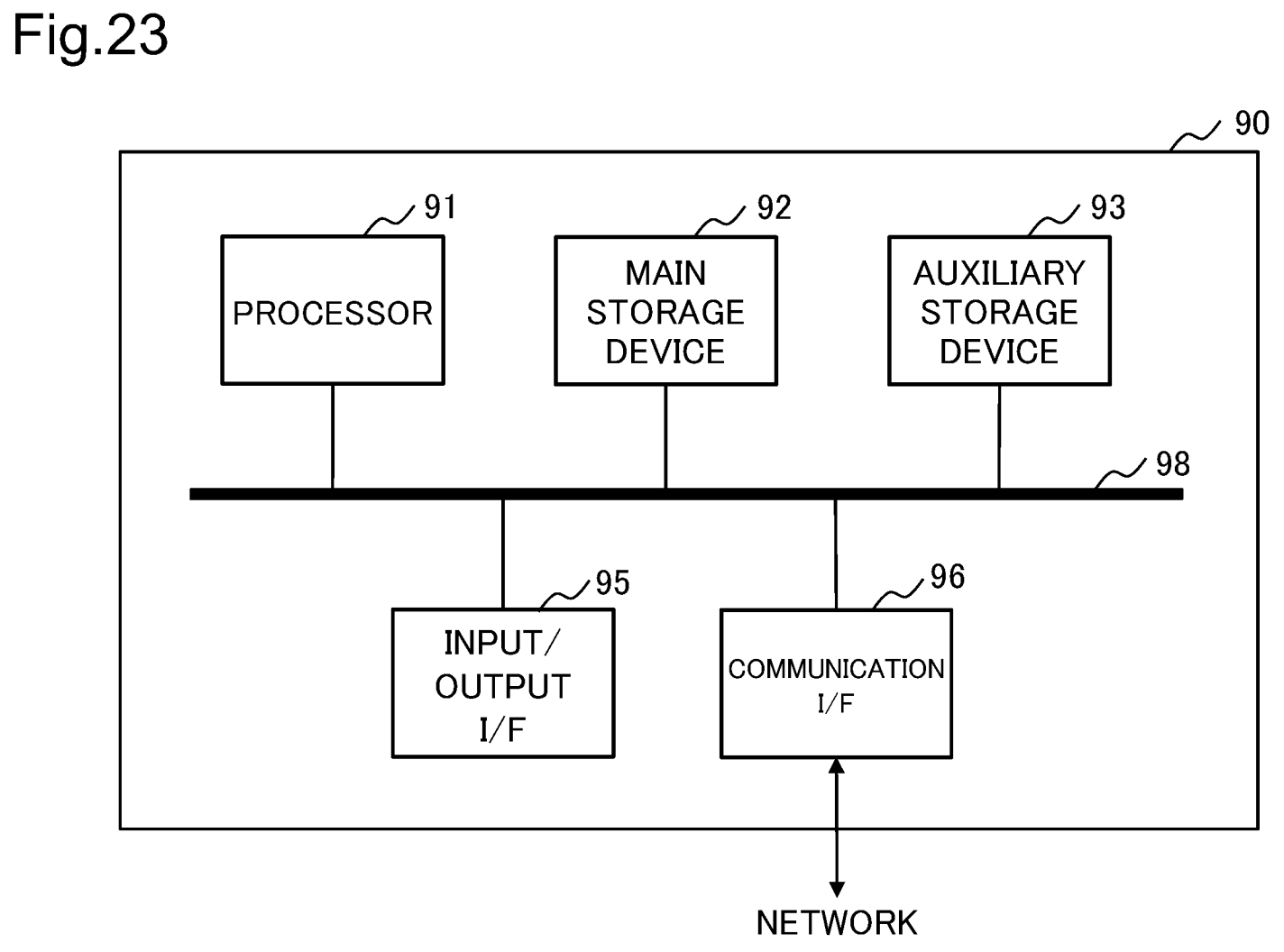

As illustrated in FIG. 23, the information processing device 90 includes a processor 91, a main storage device 92, an auxiliary storage device 93, an input/output interface 95, and a communication interface 96. In FIG. 23, the interface is abbreviated as an I/F. The processor 91, the main storage device 92, the auxiliary storage device 93, the input/output interface 95, and the communication interface 96 are data-communicably connected to each other via a bus 98. In addition, the processor 91, the main storage device 92, the auxiliary storage device 93, and the input/output interface 95 are connected to a network such as the Internet or an intranet via the communication interface 96.

The processor 91 loads a program (command) stored in the auxiliary storage device 93 or the like to the main storage device 92. For example, the program is a software program for executing the control and processing according to each example embodiment. The processor 91 executes the program loaded to the main storage device 92. The processor 91 executes the program to execute the control and processing according to each example embodiment.

The main storage device 92 has a region to which the program is loaded. A program stored in the auxiliary storage device 93 or the like is loaded to the main storage device 92 by the processor 91. The main storage device 92 may be implemented by a volatile memory such as a dynamic random access memory (DRAM). A nonvolatile memory such as a magneto resistive random access memory (MRAM) may be configured and added as the main storage device 92.

The auxiliary storage device 93 stores various pieces of data such as programs. The auxiliary storage device 93 is implemented by a local disk such as a hard disk or a flash memory. Various pieces of data may be stored in the main storage device 92, and the auxiliary storage device 93 may be omitted.

The input/output interface 95 is an interface for connecting the information processing device 90 and a peripheral device based on a standard or a specification. The communication interface 96 is an interface for connecting to an external system or device through a network such as the Internet or an intranet based on a protocol or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. In a case where a touch panel is used as the input device, a screen having a touch panel function serves as an interface. The processor 91 and the input device are connected via the input/output interface 95.

The information processing device 90 may be provided with a display device for displaying information. In a case where the display device is provided, the information processing device 90 includes a display control device (not illustrated) for controlling display of the display device. The information processing device 90 and the display device may be connected via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via the input/output interface 95.

An example of the hardware configuration for executing the control and processing according to each example embodiment of the present disclosure has been described above. The hardware configuration in FIG. 23 is an example of the hardware configuration for executing the control and processing according to each example embodiment, and does not limit the scope of the present disclosure. In addition, a program for causing a computer to execute the control and processing according to each example embodiment also falls within the scope of the present disclosure.

Further, a program recording medium having the program according to each example embodiment recorded therein also falls within the scope of the present disclosure. The recording medium can be implemented by, for example, an optical recording medium such as a compact disc (CD) or a digital versatile disc (DVD). The recording medium may be implemented by a semiconductor recording medium such as a universal serial bus (USB) memory or a secure digital (SD) card. Furthermore, the recording medium may be implemented by a magnetic recording medium such as a flexible disk, or another recording medium. In a case where the program executed by the processor is recorded in a recording medium, the recording medium corresponds to the program recording medium.

Any combination of the components of each example embodiment is possible. The components of each example embodiment may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A virtual input device comprising:
a memory storing instructions; and
a processor connected to the memory and configured to execute the instructions to:
acquire image data captured by a camera of a virtual reality display device and output display information to be displayed on a display of the virtual reality display device to the virtual reality display device;
analyze the image data to detect a physical operation terminal disposed in a real world from the image data;
specify a position of the physical operation terminal on the display of the virtual reality display device
determine a position of each key of the physical operation terminal based on at least one mark attached to the physical operation terminal;
generate the display information in which the virtual terminal having a key arrangement customized according to user information of a user wearing the virtual reality display device is displayed at the specified position of the physical operation terminal such that the virtual terminal is superimposed on the physical operation terminal;

display the generated display information including the virtual terminal superimposed on the physical operation terminal on the display of the virtual reality display device.

2. The virtual input device according to claim 1, wherein the processor is configured to execute the instructions to generate the display information in which a key to be operated by the user among a plurality of keys included in the virtual terminal is highlighted, according to the user information.

3. The virtual input device according to claim 2, wherein the processor is configured to execute the instructions to detect an operation terminal disposed in a real world from the image data, specify a position of the operation terminal on the display of the virtual reality display device, and generate the display information in which the virtual terminal is displayed at the specified position of the operation terminal.

4. The virtual input device according to claim 1, wherein the processor is configured to execute the instructions to analyze the image data and recognize an operation of the user, and generate the display information based on the recognized operation of the user.

5. The virtual input device according to claim 1, wherein the processor is configured to execute the instructions to acquire associated information based on the user information, and generate the display information in which a key associated to the associated information is highlighted.

6. The virtual input device according to claim 1, wherein the processor is configured to execute the instructions to acquire authentication information of the user who uses the virtual reality display device and perform authentication of the user based on the acquired authentication information, and generate the display information for the virtual reality display device used by the authenticated user.

7. A virtual input system comprising:

the virtual input device according to claim 1; and a virtual reality display device that includes a camera and a display, wherein the virtual reality display device is configured to output image data captured by the camera to the virtual input device, acquire display information output from the virtual input device, and display an image based on the acquired display information on the display of the virtual reality display device.

8. The virtual input system according to claim 7, further comprising an operation terminal that is disposed in a real world and operated by a user wearing the virtual input device, wherein the processor of the virtual input device is configured to execute the instructions to generate the display information in which a virtual terminal is displayed at a position of the operation terminal, and output the generated display information to the virtual reality display device, and the virtual reality display device is configured to display an image based on the display information on the display of the virtual reality display device.

9. A virtual input method executed by a computer, the method comprising:

acquiring image data captured by a camera of a virtual reality display device;

analyzing the image data to detect a physical operation terminal disposed in a real world from the image data;

specify a position of the physical operation terminal on the display of the virtual reality display device at which a virtual terminal is to be displayed; and generating display information in which the virtual terminal having a key arrangement customized according to user information of a user wearing the virtual reality display device is displayed at the specified position of the physical operation terminal such that the virtual terminal is superimposed on the physical operation terminal;

displaying the generated display information including the virtual terminal superimposed on the physical operation terminal on the display of the virtual reality display device.

10. A non-transitory recording medium recording a program for causing a computer to execute processing of:

acquiring image data captured by a camera of a virtual reality display device;

analyzing the image data to detect a physical operation terminal disposed in a real world from the image data;

specify a position of the physical operation terminal on the display of the virtual reality display device generating display information in which the virtual terminal having a key arrangement customized according to user information of a user wearing the virtual reality display device is displayed at the specified position of the physical operation terminal such that the virtual terminal is superimposed on the physical operation terminal;

displaying the generated display information including the virtual terminal superimposed on the physical operation terminal on the display of the virtual reality display device.

* * * * *